(12) United States Patent
McNamara et al.

(10) Patent No.: US 11,209,107 B2
(45) Date of Patent: Dec. 28, 2021

(54) PRE-ASSEMBLED COUPLING ASSEMBLY WITH CAP

(71) Applicant: ASC Engineered Solutions, LLC, Exeter, NH (US)

(72) Inventors: Matthew William McNamara, Portsmouth, RI (US); Jordan Cameron Belen, West Warwick, RI (US); Stephen Eric Scott, North Kingstown, RI (US)

(73) Assignee: ASC Engineered Solutions, LLC, Exeter, NH (US)

( * ) Notice: Subject to any disclaimer, the term of this patent is extended or adjusted under 35 U.S.C. 154(b) by 0 days.

(21) Appl. No.: 16/044,080

(22) Filed: Jul. 24, 2018

(65) Prior Publication Data

US 2019/0032823 A1    Jan. 31, 2019

Related U.S. Application Data

(60) Provisional application No. 62/538,480, filed on Jul. 28, 2017.

(51) Int. Cl.
*F16L 55/10* (2006.01)
*F16L 21/06* (2006.01)
(Continued)

(52) U.S. Cl.
CPC .............. *F16L 21/06* (2013.01); *F16J 15/022* (2013.01); *F16L 17/04* (2013.01); *F16L 21/007* (2013.01);
(Continued)

(58) Field of Classification Search
CPC .......... F16L 21/06; F16L 17/04; F16L 21/007; F16L 21/02; F16L 21/022; F16L 21/065; F16L 55/11; F16L 55/115
(Continued)

(56) References Cited

U.S. PATENT DOCUMENTS 29,731 A    8/1860 Truss
179,947 A  *  7/1876 O'Neill ................. F16L 37/248
                                           285/361
(Continued)

FOREIGN PATENT DOCUMENTS

CN    202024016    2/2011
CN    102003584    4/2011
(Continued)

OTHER PUBLICATIONS

McNamara, Matthew William; International Preliminary Report on Patentability for PCT Application No. PCT/US2018/44052, filed Jul. 27, 2018, dated Feb. 6, 2020, 9 pgs.
(Continued)

*Primary Examiner* — James F Hook
(74) *Attorney, Agent, or Firm* — Taylor English Duma LLP

(57) ABSTRACT

A cap configured for engagement with a coupling can comprise an annular ring extending circumferentially around an outer portion of the cap, the cap defining an inner end and an outer end disposed opposite from the inner end, the annular ring defining a sealing surface between the inner end and the outer end, the annular ring defining a raised lip at the inner end, the raised lip extending radially outward from the sealing surface; and a web, the web enclosing the annular ring.

15 Claims, 42 Drawing Sheets

(51) Int. Cl.
*F16L 21/02* (2006.01)
*F16L 17/04* (2006.01)
*F16J 15/02* (2006.01)
*F16L 55/11* (2006.01)
*F16L 55/115* (2006.01)
*F16L 33/23* (2006.01)
*F16L 21/00* (2006.01)

(52) U.S. Cl.
CPC ............ *F16L 21/02* (2013.01); *F16L 21/022* (2013.01); *F16L 21/065* (2013.01); *F16L 33/23* (2013.01); *F16L 55/11* (2013.01); *F16L 55/115* (2013.01)

(58) Field of Classification Search
USPC .................................................. 138/89, 109
See application file for complete search history.

(56) References Cited

U.S. PATENT DOCUMENTS

| | | | |
|---|---|---|---|
| 771,682 A * | 10/1904 | Sussman | F16L 19/04 285/331 |
| 1,093,868 A | 4/1914 | Leighty | |
| 1,830,782 A | 11/1931 | Burnish et al. | |
| 1,862,153 A | 6/1932 | Lee | |
| 2,020,156 A * | 11/1935 | Muchnic | E21F 15/08 285/135.5 |
| 2,131,509 A | 9/1938 | Goepel et al. | |
| 2,283,672 A * | 5/1942 | Frances | E03C 1/122 138/89 |
| 2,548,934 A * | 4/1951 | Beaird | F16L 55/115 220/324 |
| 2,794,658 A | 6/1957 | Purkhiser | |
| 2,812,959 A | 11/1957 | Fuller | |
| 2,999,700 A | 9/1961 | Smith | |
| 3,006,663 A | 10/1961 | Bowne | |
| 3,207,184 A | 9/1965 | Lambert | |
| 3,231,298 A | 1/1966 | Tomb et al. | |
| 3,233,907 A | 2/1966 | Stanton | |
| 3,235,293 A | 2/1966 | Condon | |
| 3,278,202 A | 10/1966 | Smith | |
| 3,351,352 A | 11/1967 | Blakeley et al. | |
| 3,419,291 A * | 12/1968 | Tomb | F16L 49/02 285/233 |
| 3,467,120 A * | 9/1969 | Hill | F16K 17/162 137/68.25 |
| 3,479,066 A * | 11/1969 | Gittleman | F16L 21/005 285/236 |
| 3,596,934 A | 8/1971 | Decenzo | |
| 3,633,947 A * | 1/1972 | Nelson | F16L 21/005 285/233 |
| 3,743,329 A | 7/1973 | Wesel, Sr. | |
| 3,776,579 A | 12/1973 | Gale | |
| 3,896,880 A | 7/1975 | Asp | |
| 4,127,290 A | 11/1978 | Mutschlechner | |
| 4,316,053 A | 2/1982 | Rieffle | |
| 4,417,755 A | 11/1983 | Gittleman | |
| 4,448,448 A | 5/1984 | Pollia | |
| 4,471,979 A | 9/1984 | Gibb et al. | |
| 4,522,434 A | 6/1985 | Webb | |
| 4,601,495 A | 7/1986 | Webb | |
| 4,719,687 A * | 1/1988 | Nanny | F16L 1/26 138/89 |
| 5,031,755 A | 7/1991 | Blakeley | F16L 23/08 285/112 |
| 5,131,689 A | 7/1992 | Bates | |
| 5,469,890 A * | 11/1995 | Carpentier | F16L 55/11 138/89 |
| 5,642,907 A | 7/1997 | Dole | |
| 5,658,021 A | 8/1997 | Matsumoto et al. | |
| 5,678,607 A | 10/1997 | Krywitsky | |
| 5,694,978 A * | 12/1997 | Heilmann | A61M 39/20 138/103 |
| 6,056,326 A | 5/2000 | Guest | |
| 6,123,363 A | 9/2000 | Burgard et al. | |
| 6,220,635 B1 | 4/2001 | Mitel et al. | |
| 6,450,551 B1 | 9/2002 | Lee | |
| 6,467,812 B1 | 10/2002 | Klemm et al. | |
| 6,523,866 B2 | 2/2003 | Lin | |
| 7,086,131 B2 | 8/2006 | Gibb et al. | |
| 7,533,699 B1 * | 5/2009 | Cellemme | F16L 55/115 138/89 |
| 7,712,796 B2 | 5/2010 | Gibb et al. | |
| 8,122,969 B1 | 2/2012 | Fischer | |
| 8,282,136 B2 | 10/2012 | Vandal et al. | |
| 8,480,134 B2 | 7/2013 | Crompton et al. | |
| 8,777,277 B2 | 7/2014 | Dole | |
| 9,010,164 B2 | 4/2015 | Novitsky | |
| 9,038,428 B2 | 5/2015 | Novitsky | |
| 9,194,516 B2 | 11/2015 | Beagen, Jr. | |
| 9,297,484 B2 | 3/2016 | Beagen, Jr. | |
| 9,333,543 B2 | 5/2016 | Dole | |
| 9,611,960 B2 | 4/2017 | Swingley | |
| 9,976,677 B2 | 5/2018 | Lurk et al. | |
| 10,018,290 B2 | 7/2018 | Kishi et al. | |
| 10,471,288 B2 | 11/2019 | Bancroft et al. | |
| 2003/0227171 A1 | 12/2003 | Legeai et al. | |
| 2005/0253380 A1 | 11/2005 | Gibb et al. | |
| 2006/0061095 A1 | 3/2006 | Sabando et al. | |
| 2006/0232063 A1 | 10/2006 | Steingass et al. | |
| 2007/0216158 A1 | 9/2007 | Kertesz et al. | |
| 2008/0284159 A1 * | 11/2008 | Krehl | F16L 23/22 285/112 |
| 2009/0127846 A1 | 5/2009 | Dole et al. | |
| 2009/0272453 A1 | 11/2009 | Schlecht | |
| 2012/0124804 A1 | 5/2012 | Vandal | |
| 2014/0327238 A1 | 11/2014 | Bowman | |
| 2015/0020371 A1 | 1/2015 | Beagen, Jr. | |
| 2015/0285417 A1 | 10/2015 | Beagen | |
| 2016/0223110 A1 | 8/2016 | Novitsky | |
| 2017/0184226 A1 | 6/2017 | Cuvo et al. | |
| 2017/0184232 A1 | 6/2017 | Langhelle | |
| 2017/0205014 A1 | 7/2017 | Kelk | |
| 2017/0328500 A1 | 11/2017 | Bowman et al. | |
| 2018/0200550 A1 | 7/2018 | Bancroft et al. | |
| 2018/0306369 A1 * | 10/2018 | Piontek | F16L 19/025 |
| 2019/0032824 A1 | 1/2019 | McNamara et al. | |
| 2019/0032825 A1 | 1/2019 | McNamara et al. | |
| 2019/0063645 A1 | 2/2019 | McNamara et al. | |
| 2019/0078710 A1 | 3/2019 | Nishijima et al. | |
| 2021/0080036 A1 | 3/2021 | McNamara et al. | |
| 2021/0164594 A1 | 6/2021 | McNamara et al. | |

FOREIGN PATENT DOCUMENTS

| | | |
|---|---|---|
| DE | 29506622 | 6/1995 |
| DE | 19851723 | 5/2000 |
| DE | 10340946 | 12/2004 |
| DE | 102004034791 | 6/2006 |
| DE | 102015001633 | 8/2016 |
| EP | 0264587 | 4/1988 |
| EP | 2783146 | 10/2014 |
| FR | 2184631 | 12/1973 |
| JP | H0960774 | 3/1997 |
| JP | 2009075215 | 3/2009 |
| JP | 4317352 | 8/2009 |
| KR | 100808545 | 3/2008 |
| KR | 200449405 | 7/2010 |
| KR | 100989052 | 10/2010 |
| KR | 101085122 | 11/2011 |
| KR | 101579403 | 12/2015 |
| WO | 2019023554 | 1/2019 |
| WO | 2019023556 | 1/2019 |
| WO | 2019023557 | 1/2019 |

OTHER PUBLICATIONS

McNamara, Matthew William; International Preliminary Report n Patentability for PCT Application No. PCT/US2018/044054, filed Jul. 27, 2018, dated Feb. 6, 2020, 9 pgs.

(56) References Cited

OTHER PUBLICATIONS

McNamara, Matthew William; International Preliminary Report on Patentability for PCT Application No. PCT/US2018/044055, filed Jul. 27, 2018, dated Feb. 6, 2020, 9 pgs.
McNamara, Mathew William; Invitation to Pay Additional Fees for PCT Application No. PCT/US2018/044052, filed Jul. 27, 2018, dated Sep. 12, 2018, 2 pgs.
McNamara, Matthew William; International Search Report for PCT Application No. PCT/US2018/44052, filed Jul. 27, 2018, dated Nov. 21, 2018, 12 pgs.
McNamara, Matthew William; International Search Report for PCT Application No. PCT/US2018/044054, filed Jul. 27, 2018, dated Oct. 15, 2018, 10 pgs.
McNamara, Matthew William; Invitation to Pay Additional Fees for PCT Application No. PCT/US2018/044055, filed Jul. 27, 2018, dated Sep. 17, 2018, 2 pgs.
McNamara, Matthew William; International Search Report for PCT Application No. PCT/US2018/044055, filed Jul. 27, 2018, dated Nov. 30, 2018, 12 pgs.
Victaulic; Brochure for Victaulic® VicFlex™ Flexible Hose with Fittings for Fire Protection Service, updated Jan. 2018, 18 pgs.
Victaulic; Article entitled: "Victaulic Introduces New FireLock® Innovative Groove System (IGS) for Small Diameter Hard-pipe Solutions", published May 15, 2017, 3 pgs.
Anvil, "Gruvlok Installation and Assembly Figure 7400 Rigidlite Coupling—Advanced Copper Method", Anvil Pipe Fitters Handbook, publicly available prior to Jul. 24, 2018, 3 pgs.
McNamara, Matthew William; Requirement for Restriction/Election for U.S. Appl. No. 16/044,161, filed Jul. 24, 2018, dated Jul. 29, 2020, 8 pgs.
McNamara, Matthew William; Requirement for Restriction/Election for U.S. Appl. No. 16/044,095, filed Jul. 24, 2018, dated Dec. 9, 2020, 7 pgs.
McNamara, Matthew William; Non-Final Office Action for U.S. Appl. No. 16/044,161, filed Jul. 24, 2018, dated Dec. 17, 2020, 49 pgs.
McNamara, Matthew William; Requirement for Restriction/Election for U.S. Appl. No. 16/171,809, filed Oct. 26, 2018, dated Nov. 2, 2020, 8 pgs.
McNamara, Matthew William; Non-Final Office Action for U.S. Appl. No. 16/044,095, filed Jul. 24, 2018, dated Feb. 11, 2021, 58 pgs.
McNamara, Matthew William; Non-Final Office Action for U.S. Appl. No. 16/171,809, filed Oct. 26, 2018, dated Feb. 18, 2021, 55 pgs.
McNamara, Matthew William; Extended European Search Report for application No. 18839358.1, filed Jul. 27, 2018, dated Mar. 9, 2021, 11 pgs.
McNamara, Matthew William; Extended European Search Report for application No. 18837561.2, filed Jul. 27, 2018, dated Mar. 5, 2021, 11 pgs.
McNamara, Matthew William; Extended European Search report for application No. 18838122.2, filed Jul. 27, 2018, dated Mar. 1, 2021, 10 pgs.
McNamara, Matthew William; Final Office Action for U.S. Appl. No. 16/044,095, filed Jul. 24, 2018, dated May 18, 2021, 10 pgs.
McNamara, Matthew William; Notice of Allowance for U.S. Appl. No. 16/044,095, filed Jul. 24, 2018, dated Jul. 26, 2021, 9 pgs.
McNamara, Matthew William; Final Office Action for U.S. Appl. No. 16/044,161, filed Jul. 24, 2018, dated Mar. 4, 2021, 23 pgs.
McNamara, Matthew William; Supplemental Notice of Allowance for U.S. Appl. No. 16/044,095, filed Jul. 24, 2018, dated Nov. 1, 2021, 6 pgs.
McNamara, Matthew William; Non-Final Office Action for U.S. Appl. No. 16/171,809, filed Oct. 26, 2018, dated Oct. 27, 2021, 24 pgs.

* cited by examiner

PRE-ASSEMBLED COUPLING ASSEMBLY WITH CAP

CROSS-REFERENCE TO RELATED APPLICATIONS

This application claims the benefit of U.S. Provisional Application No. 62/538,480, filed on Jul. 28, 2017, which is hereby incorporated by reference in its entirety.

TECHNICAL FIELD

This disclosure relates to couplings and pipe fittings. More specifically, this disclosure relates to couplings which are retained on pipe fittings to form a pre-assembled coupling assembly.

BACKGROUND

Pipe couplings are commonly used to connect two pipe elements, such as pipe lengths and pipe fittings, to assemble a piping system. Pipe fittings can include elbows, tees, caps, valves, reducers, and other types of pipe fittings. Slip-on pipe couplings are one type of pipe coupling which can be slipped over the ends of two adjacent pipe elements in a relaxed position and then tightened to a tensioned position to connect the two pipe elements together. It can be difficult for a single worker to align both pipe elements and secure the ends of the pipe elements within the coupling while tightening the coupling. Often multiple workers cooperate to couple the pipe elements together which can reduce efficiency and increase the man hours required to assemble the piping system.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a cap configured for engagement with a coupling, the cap comprising an annular ring extending circumferentially around an outer portion of the cap, the cap defining an inner end and an outer end disposed opposite from the inner end, the annular ring defining a sealing surface between the inner end and the outer end, the annular ring defining a raised lip at the inner end, the raised lip extending radially outward from the sealing surface; and a web, the web enclosing the annular ring.

Also disclosed is a pre-assembled coupling assembly comprising a coupling, the coupling defining a coupling bore extending through the coupling, the coupling comprising a gasket disposed within the coupling bore, the gasket being relaxed and uncompressed when the coupling is in a relaxed position; and a pipe fitting, the pipe fitting defining a first end and a second end, the first end inserted into the coupling bore, the coupling retained on the first end of the pipe fitting when the coupling is in the relaxed position.

Also disclosed is a method for using a pre-assembled coupling assembly, the method comprising providing a cap, the cap defining an inner end and an outer end, the cap defining an axis; axially inserting the inner end of the cap into a gasket, a portion of the cap within the gasket positioned radially outward from a portion of the gasket; and assembling a housing around the gasket, the housing and the gasket comprising a coupling, the coupling retained on the inner end of the cap when the coupling is in a relaxed position.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
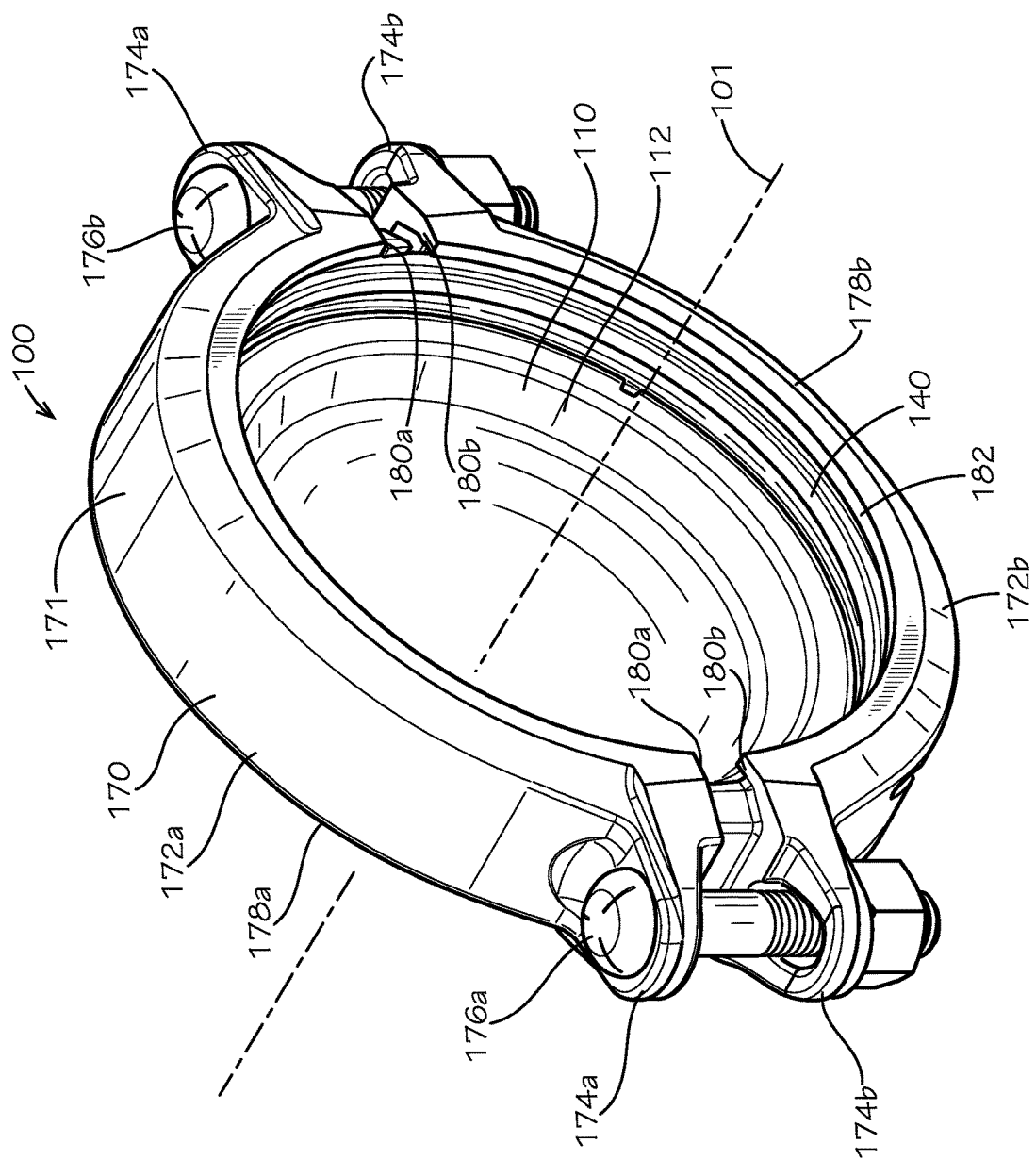
FIG. 1 is a perspective view of a pre-assembled coupling assembly comprising a coupling and a cap in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a pre-assembled coupling assembly with a cap and associated methods, systems, devices, and various apparatus. The pre-assembled coupling assembly can comprise the cap and a coupling retained on an end of the cap. It would be understood by one of skill in the art that the disclosed pre-assembled coupling is described in but a few exemplary aspects among many. No particular terminology or description should be considered limiting on the disclosure or the scope of any claims issuing therefrom.

FIG. 1 shows a perspective view of a pre-assembled coupling assembly 100. The pre-assembled coupling assembly 100 can comprise a pipe fitting 110, such as a cap 112, and a coupling 170. In some aspects, the coupling 170 can be a slip-on coupling, such as the slip-on coupling described in U.S. Pat. No. 9,194,516, issued on Nov. 24, 2015, which is hereby incorporated by reference in its entirety.

In the present aspect, the coupling 170 can comprise a housing 171 and a gasket 140, which can be enclosed and encircled by the housing 171. The housing 171 can comprise a first segment 172a and a second segment 172b. The first segment 172a can define a pair of fastener ears 174a disposed at opposite ends of the first segment 172a. The second segment 172b can define a pair of fastener ears 174b disposed at opposite ends of the second segment 172b. A pair of fasteners 176a,b, which can comprise nuts and bolts in some aspects, can extend through the fastener ears 174a of the first segment 172a and the fastener ears 174b of the second segment 172b to secure the first segment 172a to the second segment 172b.

In the present aspect, the housing 171 can be substantially circular in shape, and each of the segments 172a,b can define a semicircular arc shape. The housing 171 can define a coupling bore 182 extending through the housing 171 from a first end 178a to a second end 178b of the housing 171. The gasket 140 can be disposed within the coupling bore 182. The coupling bore 182 can define an axis 101. The first segment 172a can define a pair of shoulders 180a disposed at opposite ends of the first segment 172a and proximate to the respective fastener ears 174a. The second segment 172b can define a pair of shoulders 180b disposed at opposite ends of the second segment 172b and proximate to the respective fastener ears 174b.

In the present aspect, the coupling 170 can be in a relaxed position. In the relaxed position of the coupling 170, the shoulders 180a can be spaced apart from the shoulders 180b, and the gasket 140 can be relaxed and uncompressed by the housing 171. The fasteners 176a,b can be tightened to reconfigure the coupling 170 from the relaxed position to a tensioned position. In the tensioned position of the coupling 170, the shoulders 180a of the first segment 172a can be pressed against the shoulders 180b of the second segment 172b, and the gasket 140 can be compressed radially inward relative to the axis 101. In some aspects, each segment 172a,b can be deformed by the fasteners 176a,b, to align and engage the shoulders 180a of the first segment 172a with the shoulders 180b of the second segment 172b.

The cap 112 can extend into the coupling bore 182 at the first end 178a of the housing 171. The pre-assembled coupling assembly 100 can be configured to fit over an end 502 (end 502 shown in FIG. 5) of a pipe 500 (pipe 500 shown in FIG. 5) or other pipe fitting 110. The coupling 170 can then be tightened to the tensioned position to secure the pre-assembled coupling assembly 100 on the pipe 500, thereby sealing the pipe 500 to the cap 112. In other aspects, the pipe fitting 110 can be another type of pipe fitting such as a tee, an elbow, a reducer, a valve, or any other suitable type of pipe fitting.

Figure 5:
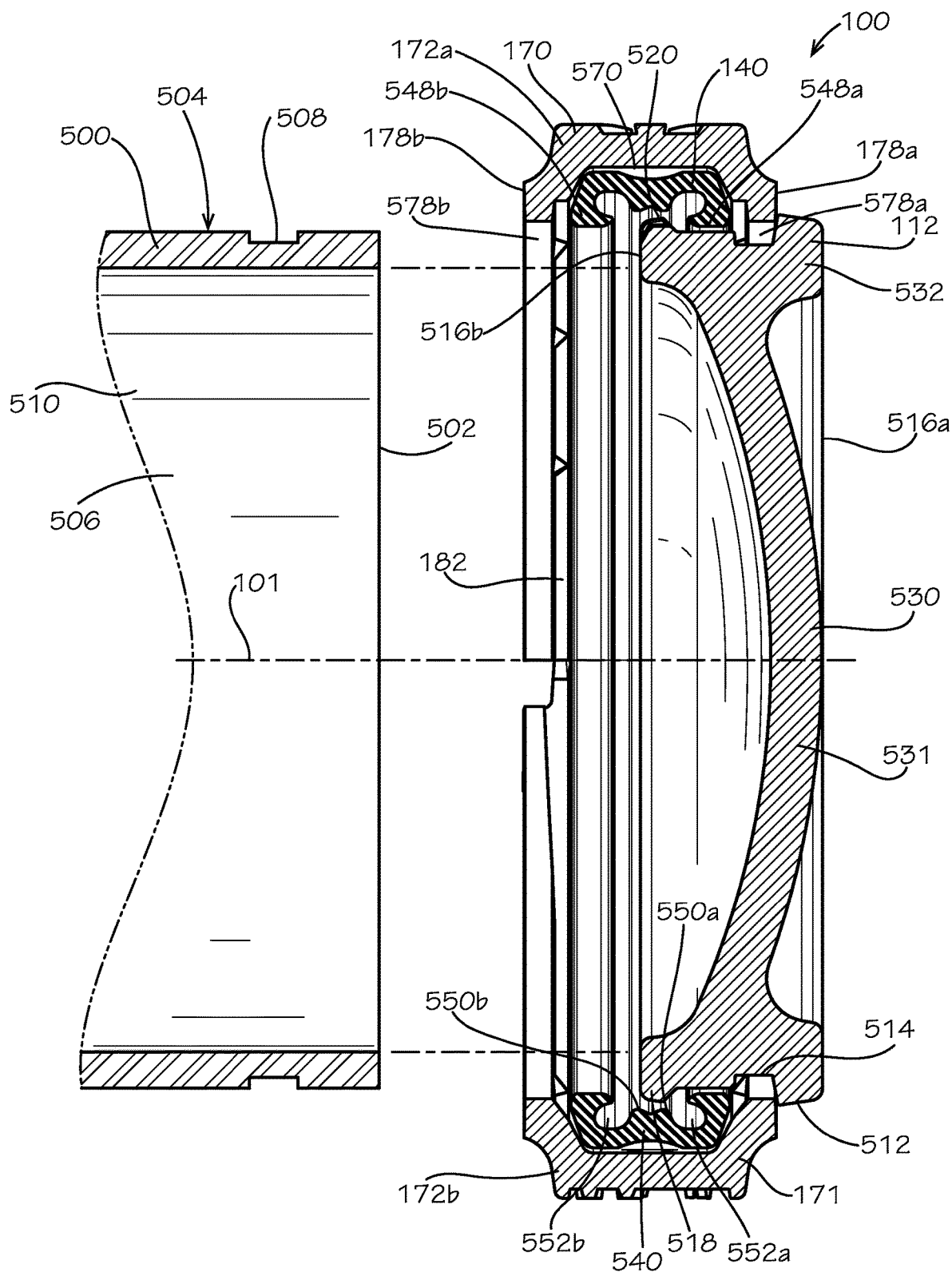
FIG. 5 is a cross-sectional view of the pre-assembled coupling assembly of FIG. 1 taken along line 5-5 shown in FIG. 3 and further comprising a pipe.
Figure 6A:
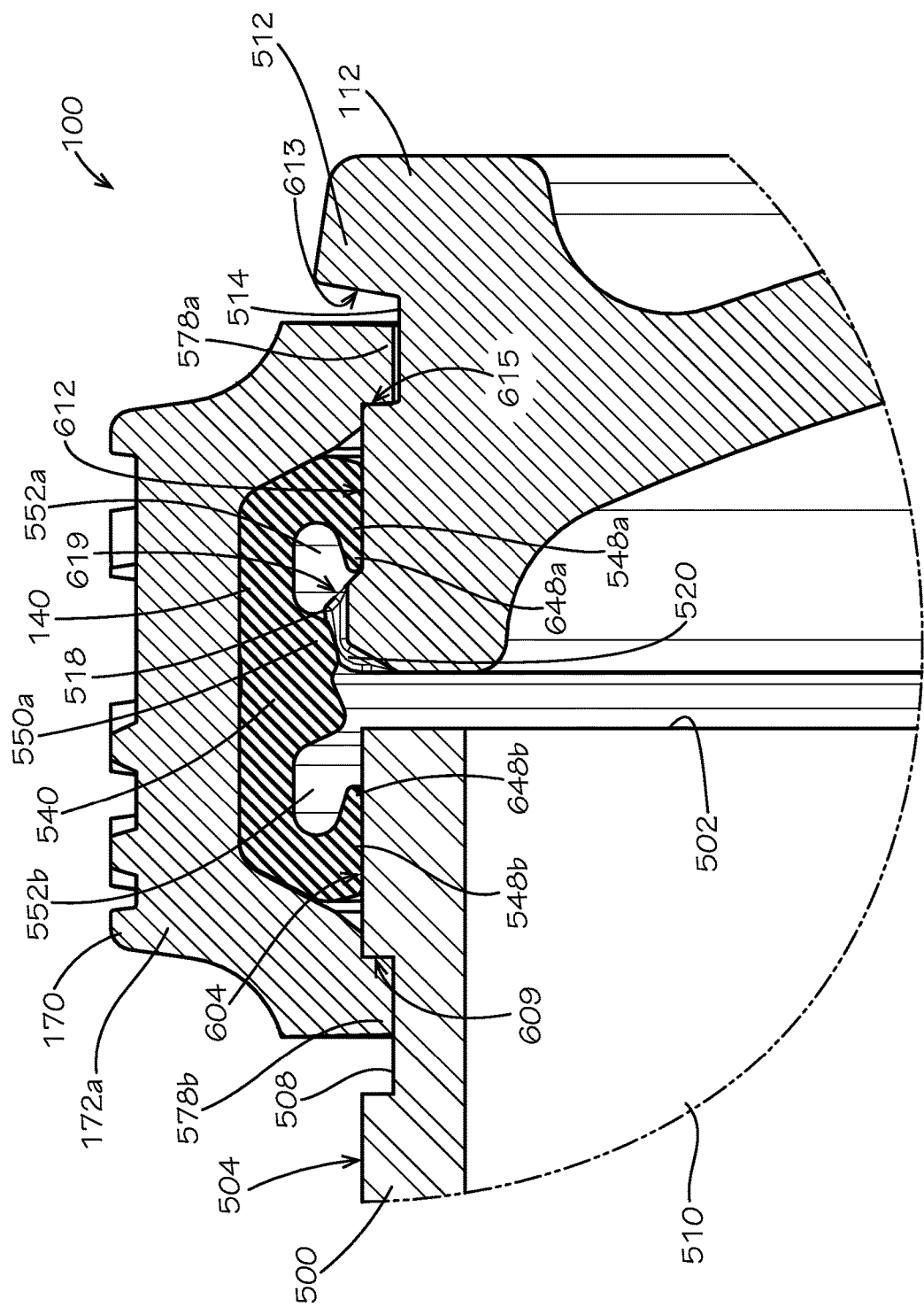
FIG. 6A is a detailed cross-sectional view of the pipe, the cap, and the coupling of the pre-assembled coupling assembly of FIG. 5.
Figure 6B:
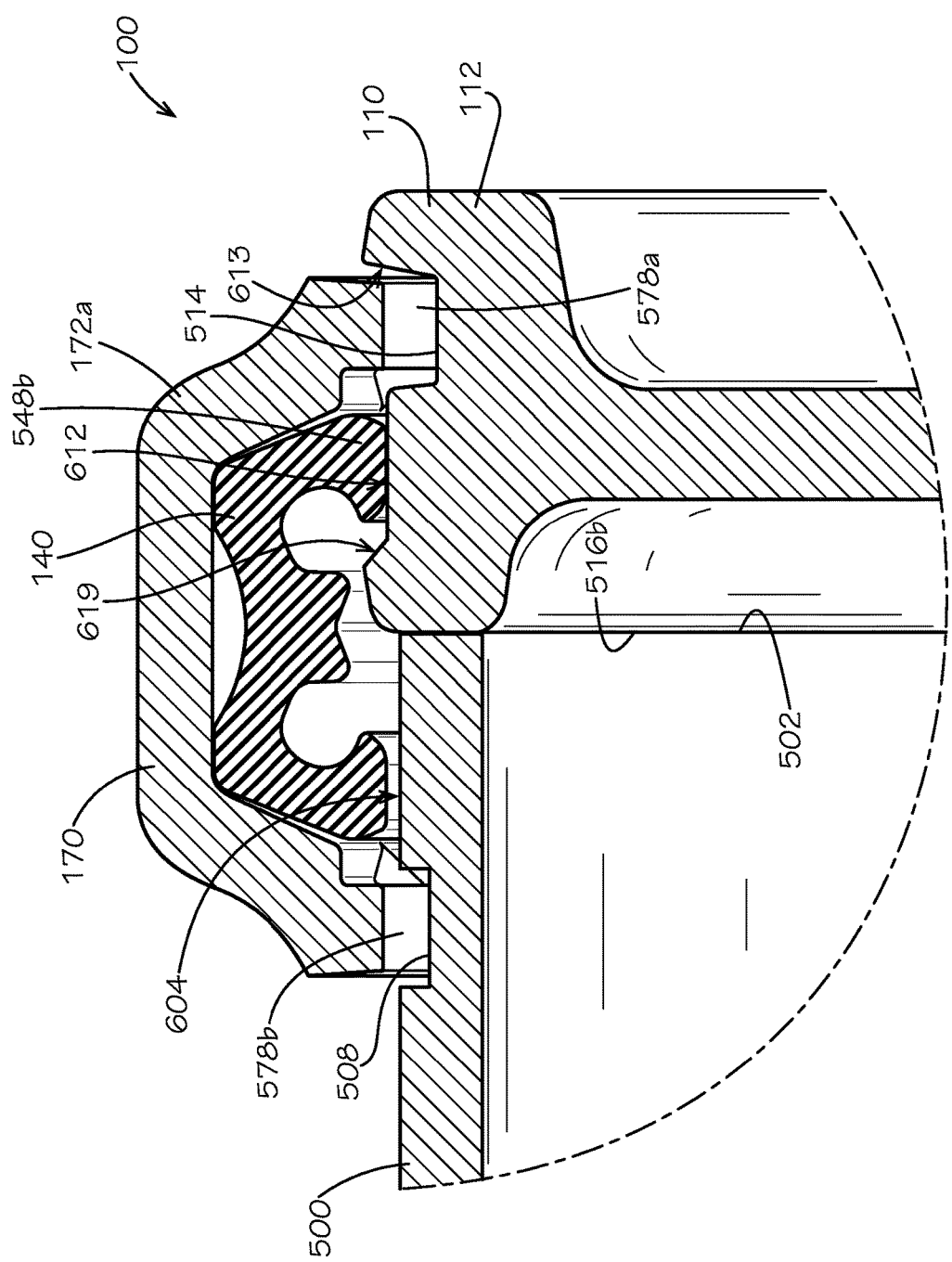
FIG. 6B is a detailed cross-sectional view of the pipe and the coupling of the pre-assembled coupling assembly of FIG. 5 and another aspect of the cap in accordance with another aspect of the current disclosure.

As shown and further described with respect to FIGS. 5, 6A, and 6B, the cap 112 can interfere with the gasket 140 so that the coupling 170 can be retained on the cap 112 when the coupling 170 is in the relaxed position. It can be desirable for the coupling 170 to be retained on the cap 112 so that the pre-assembled coupling assembly 100 can be easily attached to the pipe 500. For example, a user can hold the pipe 500 with one hand, and the pre-assembled coupling assembly 100 can be slipped over the end 502 of the pipe 500 with a second hand of the user. Additionally, because the coupling 170 can be retained on the pipe fitting 110, the user is less likely to lose or mix up parts, such as in a field environment, because the pre-assembled coupling assembly 100 may not come apart without a deliberate effort by the user.

Figure 2:
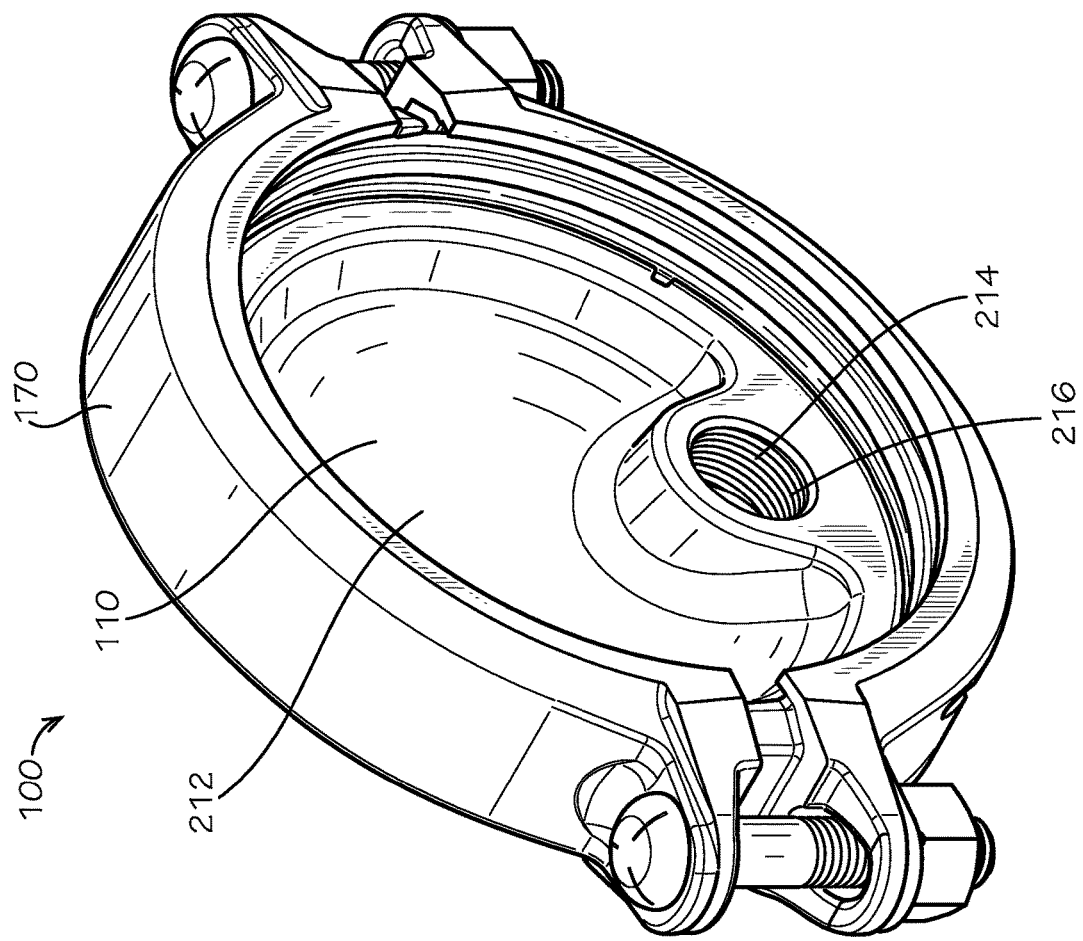
FIG. 2 is a perspective view of another aspect of a pre-assembled coupling assembly comprising the coupling of FIG. 1 and a drain cap in accordance with another aspect of the present disclosure.

FIG. 2 is a perspective view of another aspect of the pre-assembled coupling assembly 100 comprising the coupling 170 of FIG. 1 and another aspect of the pipe fitting 110 in accordance with another aspect of the present disclosure. In the present aspect, the pipe fitting 110 can be a drain cap 212. The drain cap 212 can be similar to the cap 112 of FIG. 1; however, the drain cap 212 can define a drain bore 214 extending through the drain cap 212. In the present aspect, the drain bore 214 can define internal threading 216, for example and without limitation, National Pipe Thread ("NPT") tapered threading. The internal threading 216 can be configured to receive a plug or a drain pipe which can define external threading shaped complimentary to the internal threading 216. In other aspects, the drain cap 212 can be used for purposes other than draining. For example and without limitation, an instrument, such as a pressure gauge for example and without limitation, can be attached to the drain bore 214 so that properties of fluids within the piping system can be monitored. In other aspects, a small valve can be attached to the drain bore 214, for example and without limitation, which can be used for sampling fluids or injecting fluids into the piping system.

Figure 3:
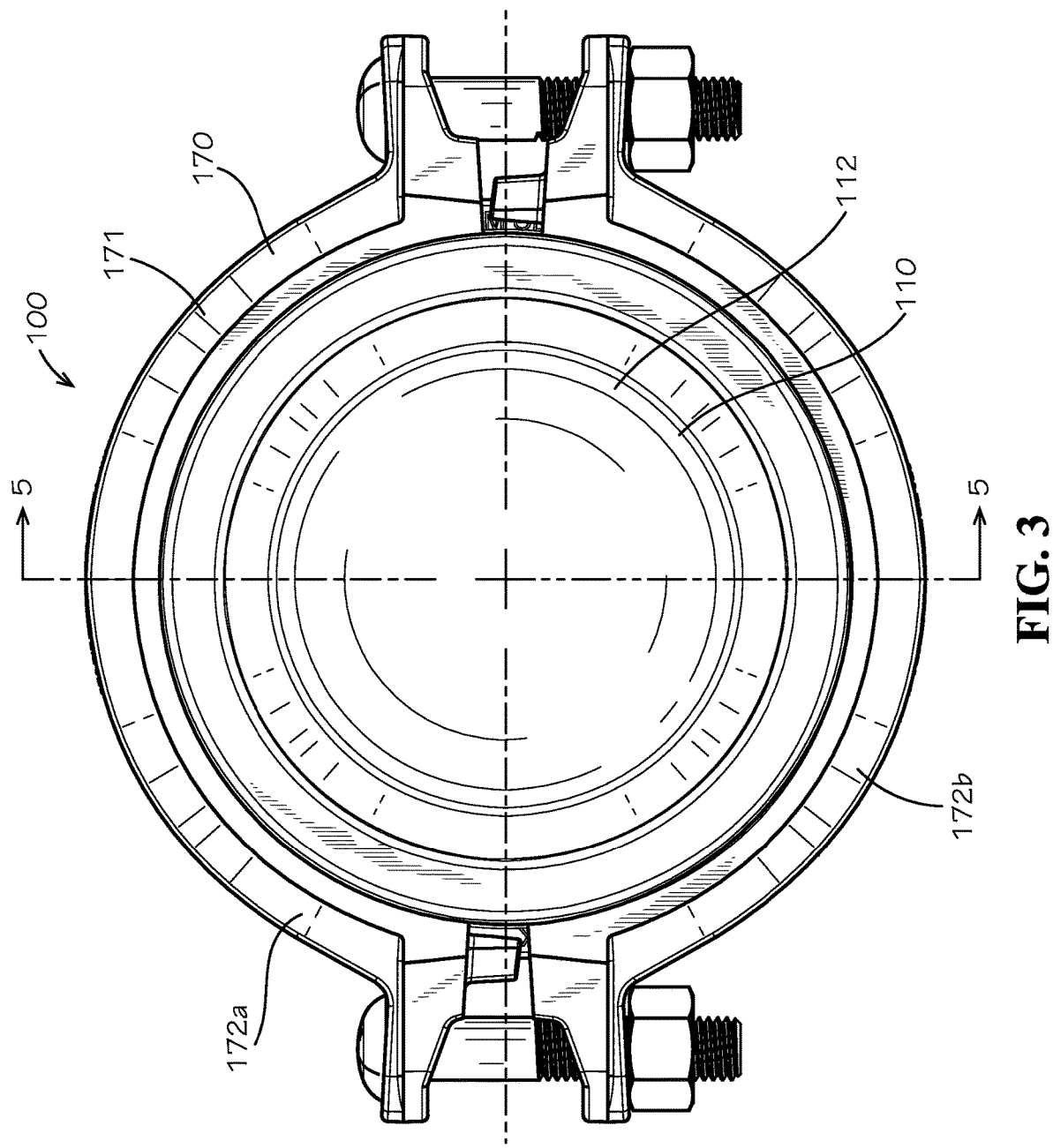
FIG. 3 is a front view of the pre-assembled coupling assembly of FIG. 1.
Figure 4:
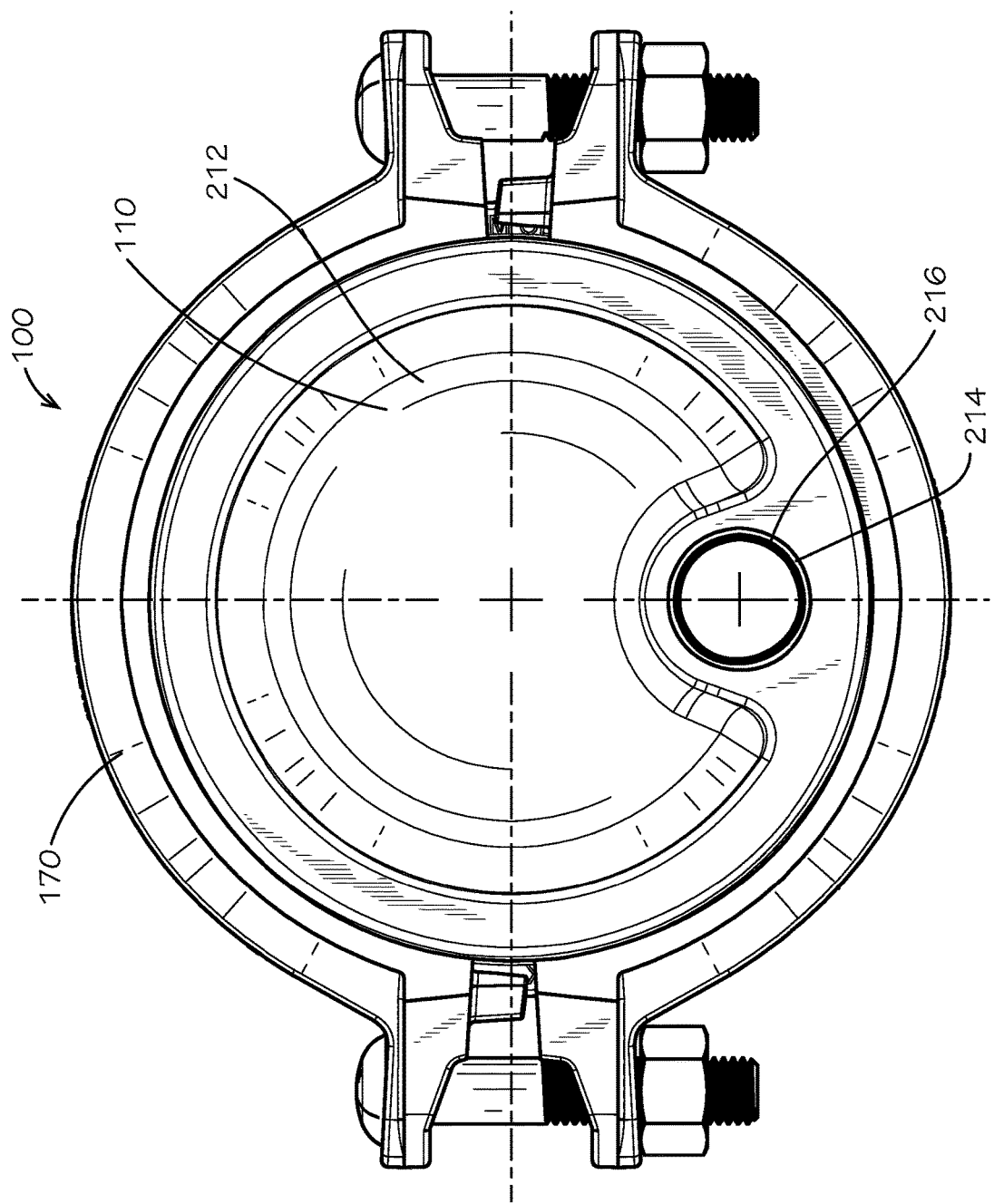
FIG. 4 is a front view of the pre-assembled coupling assembly of FIG. 2.

FIG. 3 is a front view of the pre-assembled coupling assembly 100 of FIG. 1. FIG. 4 is a front view of the pre-assembled coupling assembly 100 of FIG. 2. Angles and dimensions shown in FIGS. 1-16C are merely exemplary and should not be viewed as limiting. The structures and components shown can be scaled upwards or downwards, reshaped, or resized in other aspects.

FIG. 5 is a cross-section of the pre-assembled coupling assembly 100 of FIG. 1 and the pipe 500 taken along line 5-5 shown in FIG. 3. The housing 171 can define a ridge 578a disposed at the first end 178a of the housing 171 and a ridge 578b disposed at the second end 178b of the housing 171. The ridges 578a,b can extend radially inward relative to the axis 101. The housing 171 can define a gasket groove 570 within the coupling bore 182 which can be disposed between the ridges 578a,b, and the gasket 140 can be seated within the gasket groove 570.

The gasket 140 can define a sealing ridge 548a disposed proximate to the first end 178a of the housing 171 and a sealing ridge 548b disposed proximate to the second end 178b of the housing 171. The sealing ridges 548a,b can extend radially inward from the gasket 140 relative to the axis 101. The gasket 140 can also define a center ridge 540 disposed between the sealing ridges 548a,b. The center ridge 540 can extend radially inward from the gasket 140, and the center ridge 540 can define a pair of ribs 550a,b at a radially innermost end of the center ridge 540. The gasket 140 can define a sealing channel 552a disposed between the sealing ridge 548a and the rib 550a and a sealing channel 552b disposed between the sealing ridge 548b and the rib 550b.

The pipe 500 can define an inner pipe surface 506 and an outer pipe surface 504 disposed opposite from the inner pipe surface 506. The inner pipe surface 506 can define a pipe bore 510 extending through the pipe 500, and the pipe bore 510 can carry pressurized fluids through the piping system. A circumferential groove 508 can be defined extending radially inward into the outer pipe surface 504 relative to the axis 101. The groove 508 can be disposed proximate to the end 502 of the pipe 500. The ridge 578b can be configured to engage the groove 508 when the end 502 of the pipe 500 is inserted into the coupling bore 182 and the coupling 170 is in the tensioned position. When engaged with the groove 508, the ridge 578b secures the coupling 170 to the pipe 500 and prevents axial movement of the pipe 500 relative to the coupling 170.

The cap 112 can define an outer end 516a disposed external to the coupling bore 182 and an inner end 516b disposed within the coupling bore 182. The cap 112 can define an outer lip 512 which can extend radially outward from the cap 112 proximate to the outer end 516a. In the present aspect, the outer lip 512 can radially overlap with the first ridge 578a of the housing 171 when the coupling 170 is in the relaxed position. The outer lip 512 can provide a physical stop which can thereby prevent the outer end 516a of the cap 112 from entering the coupling bore 182.

The cap 112 can define a raised lip 518 disposed at the inner end 516b, and the raised lip 518 can extend radially outward from the inner end 516b relative to the axis 101. In the present aspect, the raised lip 518 can be disposed radially inward from the outer lip 512, therefore allowing the inner end 516b and the raised lip 518 to be inserted into the coupling bore 182 with the coupling 170 in the relaxed position. In other aspects, the raised lip 518 can extend radially outwards beyond the first ridge 578a with the coupling 170 in the relaxed position, thereby preventing insertion and removal of the inner end 516b from the coupling bore 182. In such aspects, the first segment 172a and the second segment 172b of the housing 171 can be assembled around the inner end 516b of the cap 112 to capture the inner end 516b within the coupling bore 182. In such aspects, the inner end 516b of the cap 112 may not be removed from the coupling bore 182 without disassembling the housing 171.

The raised lip 518 can be sized to radially interfere with the sealing ridge 548a of the gasket 140 when the gasket 140 is in the relaxed and uncompressed state. For example, a radially outermost portion of the raised lip 518 can be disposed radially outward from a radially innermost portion of the sealing ridge 548a when the raised lip 518 is axially positioned between the sealing ridges 548a,b relative to the axis 101. The gasket 140 can comprise an elastic material, such as a rubber, a polymer, an elastomer, or any other suitable material, and the gasket 140 can be flexible and resilient.

Interference between the raised lip 518 and the sealing ridge 548a can prevent accidental removal of the inner end 516b of the cap 112 from the coupling bore 182 when the coupling 170 is in the relaxed position. The sealing ridge 548a can stretch over the raised lip 518 when the inner end 516b is inserted into or withdrawn from the coupling bore 182. In the present aspect, the sealing ridge 548a can be in a relaxed state when the coupling 170 is in the relaxed position, and the sealing ridge 548a is axially positioned between the raised lip 518 and the outer lip 512 of the cap 112 relative to the axis 101.

In the present aspect, the inner end 516b of the cap 112 can be withdrawn from the coupling bore 182 of the coupling 170 with a deliberate force when the coupling 170 is in the relaxed position. By exerting the deliberate force, the sealing ridge 548a can stretch over the raised lip 518 to allow the cap 112 to be removed from the coupling 170. The resistance provided by the sealing ridge 548a can be optimized to prevent accidental disassembly of the pre-assembled coupling assembly 100 while still allowing for deliberate disassembly of the pre-assembled coupling assembly 100 without undue difficulty. For example, with the coupling 170 in the relaxed position, the pre-assembled coupling assembly 100 can be disassembled with the fingers of a user possessing typical hand strength without the need for tools while also resisting separation of the coupling 170 from the cap 112 by the force of gravity and general handling of the pre-assembled coupling assembly 100. For example, the coupling 170 and the cap 112 can resist separation if a user carries the pre-assembled coupling assembly 100 without supporting both the coupling 170 and the cap 112.

In the present aspect, the cap 112 can define a groove 514 extending radially inward into the cap 112 between the outer lip 512 and the raised lip 518. The groove 514 can be configured to receive the first ridge 578a of the housing 171 when the coupling 170 is in the tensioned position. Engagement between the first ridge 578a and the groove 514 can secure the cap 112 to the coupling 170 and prevent the inner end 516b of the cap 112 from being withdrawn from the coupling bore 182 when the coupling 170 is in the tensioned position.

The groove 514, the outer lip 512, and the raised lip 518 can each be defined by an annular ring 532 of the cap 112. The annular ring 532 can extend circumferentially around radially outer portions of the cap 112. A web 530 can be defined within the annular ring 532, and the web 530 can enclose the annular ring 532. In the present aspect, the web 530 can be a dished web 531, which can define a convex shape when viewed from the outer end 516a and a concave shape when viewed from the inner end 516b.

The raised lip 518 can define at least one pressure relief channel 520 defined at the inner end 516b of the cap 112.

The pressure relief channel 520 can extend through the raised lip 518 as shown and further described with respect to FIGS. 10 and 11 below.

FIG. 6A is a detailed cross-sectional view of the pipe 500, the cap 112, and the coupling 170 of FIG. 5 with the coupling 170 in the tensioned position and with the pre-assembled coupling assembly 100 in a pressurized condition in which fluid is allowed to flow into the pipe 500 to apply fluid pressure to the cap 112 and the gasket 140. In the tensioned position, the gasket 140 can be compressed radially inward to form seals with the pipe 500 and the cap 112. The sealing ridge 548a can form a seal with a sealing surface 612 defined by the cap 112. In the present aspect, the sealing surface 612 can be defined between the raised lip 518 and the groove 514, and the raised lip 518 can extend radially outward from the sealing surface 612. The sealing ridge 548b can form a seal with a sealing portion 604 of the outer pipe surface 504 of the pipe 500 defined between the groove 508 and the end 502 of the pipe 500. The raised lip 518 can also define a ramped surface 619. The ramped surface 619 can be angled, as shown in FIG. 6A, thereby taking the shape of a truncated cone, or can be curved in other aspects. The angle or curve of the ramped surface 619 can be configured to guide the sealing ridge 548a into position around the sealing surface 612 as the cap 112 is inserted into the coupling 170, and the gasket 140 can also be configured to prevent removal of the gasket 140 from over the raised lip 518 when the gasket 140 is in the relaxed position.

The outer lip 512 can also define a ramped surface 613 facing axially towards the pipe 500. The ramped surface 613 can also define a side of the groove 514 axially outward from the coupling 170. The ramped surface 613 can be angled, as shown in FIG. 6A, thereby taking the shape of a truncated cone, or can be curved in other aspects, and can extend to a bottom of the groove 514. The angle or curve of the ramped surface 613 can be configured to guide the first ridge 578a into position in the groove 514 when the coupling 170 is tightened into the tensioned position. The ramped surface 613 can thereby function as a locating feature to allow the user to ensure that the coupling 170 is properly positioned over the cap 112 and, when the pipe 500 is inserted into the coupling 170 to abut the cap 112, as shown in FIG. 6B, the coupling 170 is likewise properly positioned over the pipe 500 such that the ridge 578b is aligned over the groove 508. Thus, when the coupling 170 is tightened into the tensioned position, the ridge 578b can be properly guided into the groove 508. In various aspects, the groove 514 can be narrower in the axial direction than the groove 508 so that the ridge 578b can be spaced slightly in the axial direction from sides of the groove 508. This can ensure that the ridge 578b properly seats into the groove 508 without inadvertently contacting sides of the groove 508 when the coupling 170 is tightened.

Further, the grooves 508,514 of the pipe 500 and the cap 112, respectively, can each define side stop surfaces 609, 615, respectively. The side stop surfaces 609,615 act as stops to prevent the pipe 500 and the cap 112, respectively, from being removed from the coupling 170 when the coupling 170 is in the tensioned position by engaging the ridges 578a,b when either or both of the pipe 500 and the cap 112 are pushed or pulled axially outward from the coupling 170, such as when the pre-assembled coupling assembly 100 is in the pressurized condition.

FIG. 6A also shows that portions of the first segment 172a and, similarly, the second segment 172b can contact outer surfaces of the pipe 500 and the cap 112 adjacent to the grooves 508,514, respectively, when the coupling 170 is in the tensioned condition. However, in other aspects, the segments 172a,b may contact only one or both of the grooves 508,514, or contact the groove 508 and the outer surface of the cap 112 adjacent to the groove 514, or contact the groove 514 and the outer surface of the pipe 500 adjacent to the groove 508.

In the tensioned position, the center ridge 540 can be compressed radially inward, and the rib 550a can contact the raised lip 518. In some aspects, the rib 550a can form a secondary seal with the raised lip 518. In the present aspect, the pressure relief channel 520 can maintain fluid communication between the sealing channel 552a and the pipe bore 510. By maintaining fluid communication between the sealing channel 552a and the pipe bore 510, pressurized fluids carried by the pipe 500 can exert pressure within the sealing channel 552a which can energize the seal formed between the sealing ridge 548a and the sealing surface 612 of the cap 112. The sealing channel 552a can define a U-shape of the sealing ridge 548a, and pressure exerted within the sealing channel 552a can press an axially inner end 648a of the sealing ridge 548a against the sealing surface 612. The sealing ridge 548b can function similarly, and pressurized fluids within the sealing channel 552b can press an axially inner end 648b of the sealing ridge 548b against the sealing portion 604 of the outer pipe surface 504 of the pipe 500 to energize the seal between the sealing ridge 548b and the pipe 500.

FIG. 6B is a detailed cross-sectional view of the pipe 500 and the coupling 170 of FIG. 5 and another aspect of the cap 112, with the coupling 170 in the relaxed position with the pipe 500 inserted into the coupling 170 and abutting the cap 112. The cross-section of FIG. 6B is taken from a sectional line extending through mid-sections of the first segment 172a and the second segment 172b (shown in FIG. 1). When the pipe 500 is inserted into pre-assembled coupling assembly 100 with the pipe fitting 110, the end 502 of the pipe 500 abuts the inner end 516b of the pipe fitting 110, which is a cap 112 in the current aspect. With the ramped surface 619 preventing withdrawal of the gasket 140 and thereby the coupling 170, and with the ramped surface 613 preventing further insertion of the cap 112 into the coupling 170, the pipe 500 can thereby be held in position to locate the ridge 578b over the groove 508. In the current aspect, the sealing ridge 548b can also be in contact with the sealing surface 612 when the coupling 170 is in the relaxed position, further holding the cap 112 in the coupling 170.

As shown in FIG. 6B, in some aspects, the bottom of the groove 514 can define a smaller diameter than a bottom of the groove 508. This can provide the benefit of the ridge 578b rigidly contacting the pipe 500 before the ridge 578a contacts the cap 112, ensuring that the coupling 170 is rigidly attached to the pipe 500. The sealing surface 612 of the cap 112 can also define a larger diameter than the sealing portion 604 of the pipe 500, which can better hold the gasket 140, and thereby the coupling 170, on the cap 112. The diameter of the sealing surface 612 can be sized such that the gasket 140 contacts the sealing surface 612 in the relaxed position, or can be sized such that the gasket 140 does not contact the sealing surface 612 in the relaxed position but is closer to the gasket 140 than the sealing portion 604.

Figure 7:
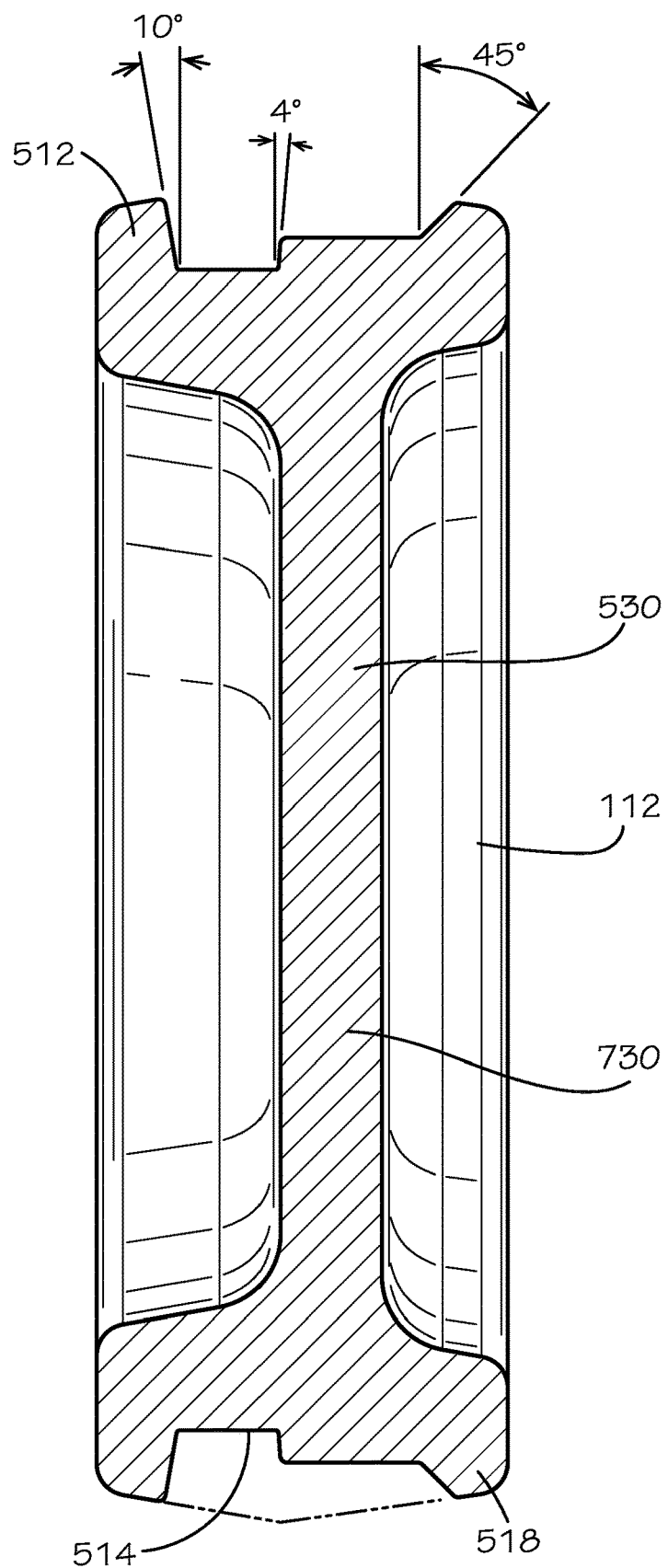
FIG. 7 is a cross-sectional view of the cap of FIG. 6B.
Figure 8:
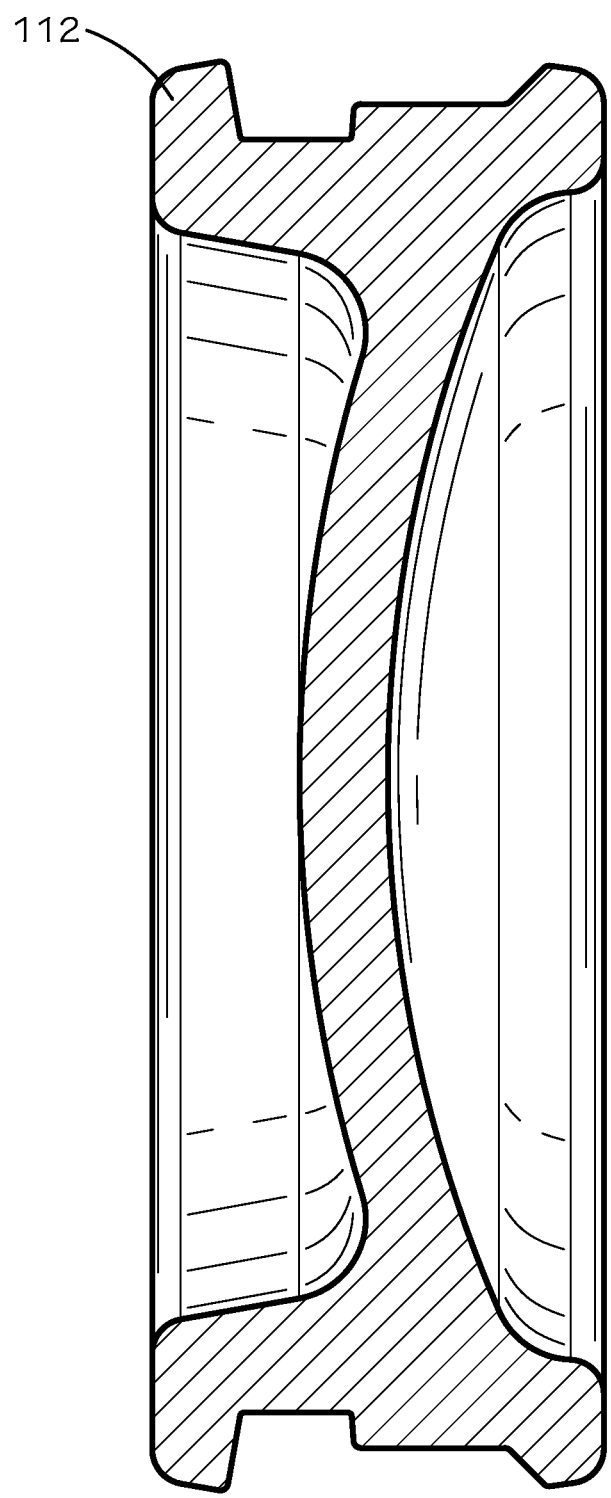
FIG. 8 is cross-sectional view of the cap of FIG. 5.
Figure 9:
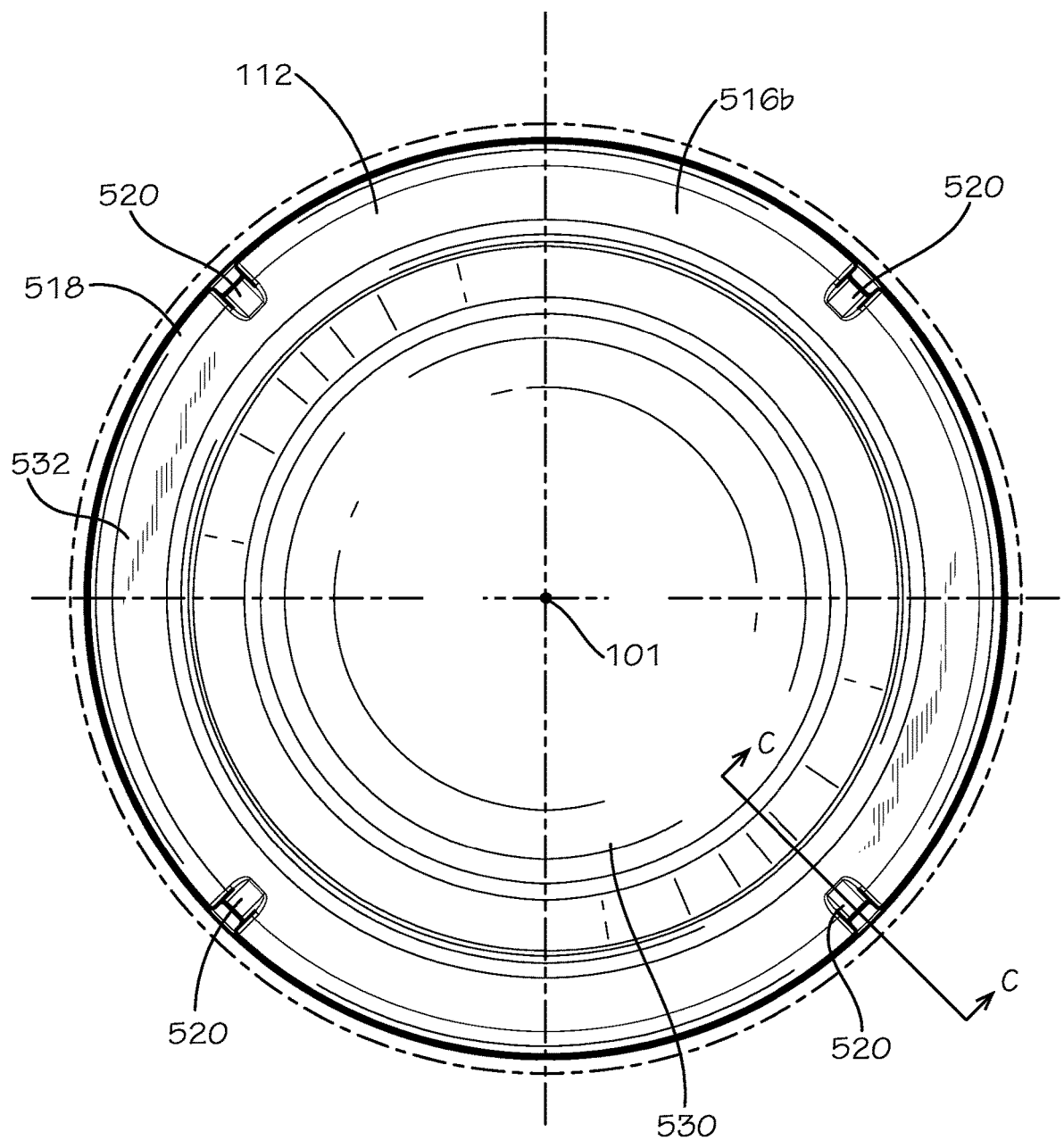
FIG. 9 is an end view of the cap of FIG. 5 facing an inner end of the cap that defines a pressure relief channel.

FIG. 7 is a cross-sectional view of another aspect of the cap 112 in accordance with another aspect of the present disclosure. In the aspect shown, the web 530 of the cap 112 can be a planar web 730. FIG. 8 is a cross-sectional view of the cap 112 of the aspect of FIG. 5. FIG. 9 is an end view of the cap 112 of FIG. 5 facing the inner end 516b of the cap 112. As shown, the cap 112 can define a plurality of pressure relief channels 520 defined into the raised lip 518. In the present aspect, the cap 112 can define four pressure relief channels 520 which can be equally circumferentially spaced around the raised lip 518. In other aspects, the cap 112 can define greater or fewer than four pressure relief channels 520, and the pressure relief channels 520 can be distributed in any suitable configuration around the raised lip 518.

Figure 10:
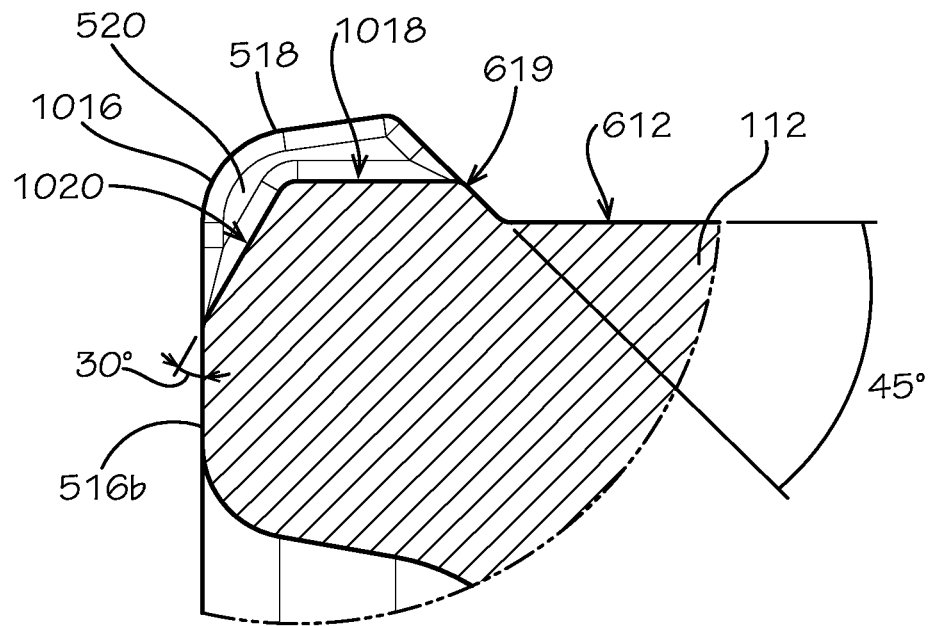
FIG. 10 is a detailed cross-sectional view of the pressure relief channel of FIG. 9 taken along line C-C shown in FIG. 9.

FIG. 10 is a detail cross-sectional view of a one of the pressure relief channels 520 of FIG. 9 taken along line C-C shown in FIG. 9. The pressure relief channel 520 can comprise an angled surface 1020 and an axial surface 1018. The angled surface 1020 can be angled relative to the inner end 516*b* of the cap 112 and relative to the sealing surface 612. In the present aspect, the angled surface 1020 can define a 30-degree angle with the inner end 516*b* of the cap 112; however, in other aspects, the angle can be larger or smaller than 30 degrees. The axial surface 1018 can be substantially parallel to the axis 101 (shown in FIG. 9) and the sealing surface 612. The axial surface 1018 can be defined radially outward from the sealing surface 612 of the cap 112 and radially inward from the raised lip 518.

The raised lip 518 can define a rounded transition surface 1016 defined at the inner end 516*b* of the cap 112. The raised lip 518 can define the ramped surface 619 extending to the sealing surface 612. In the present aspect, the ramped surface 619 can define a 45-degree angle with the sealing surface 612; however, in other aspects, the angle can be greater or smaller than 45 degrees.

Figure 11:
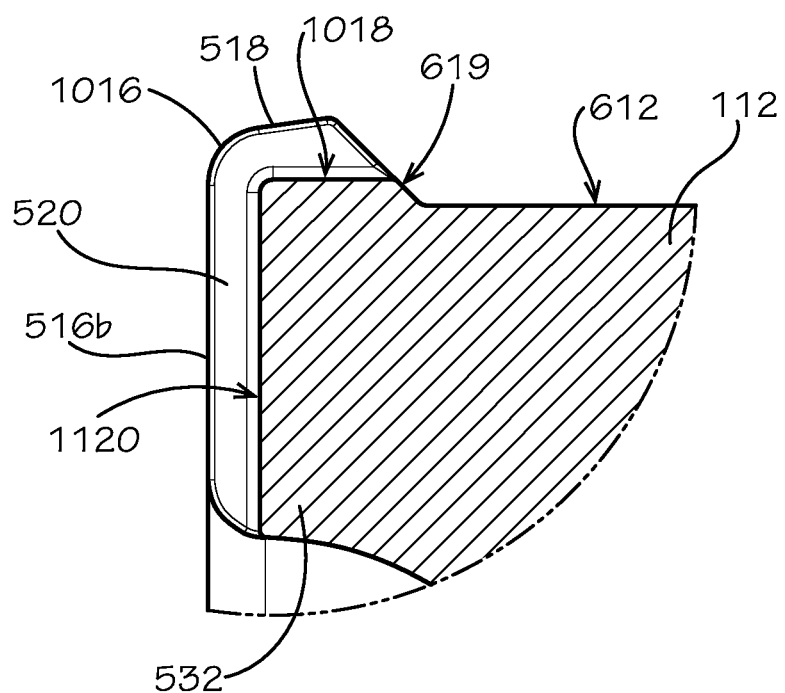
FIG. 11 is a detailed cross-sectional view of another aspect of the pressure relief channel in accordance with another aspect of the present disclosure.
Figure 12A:
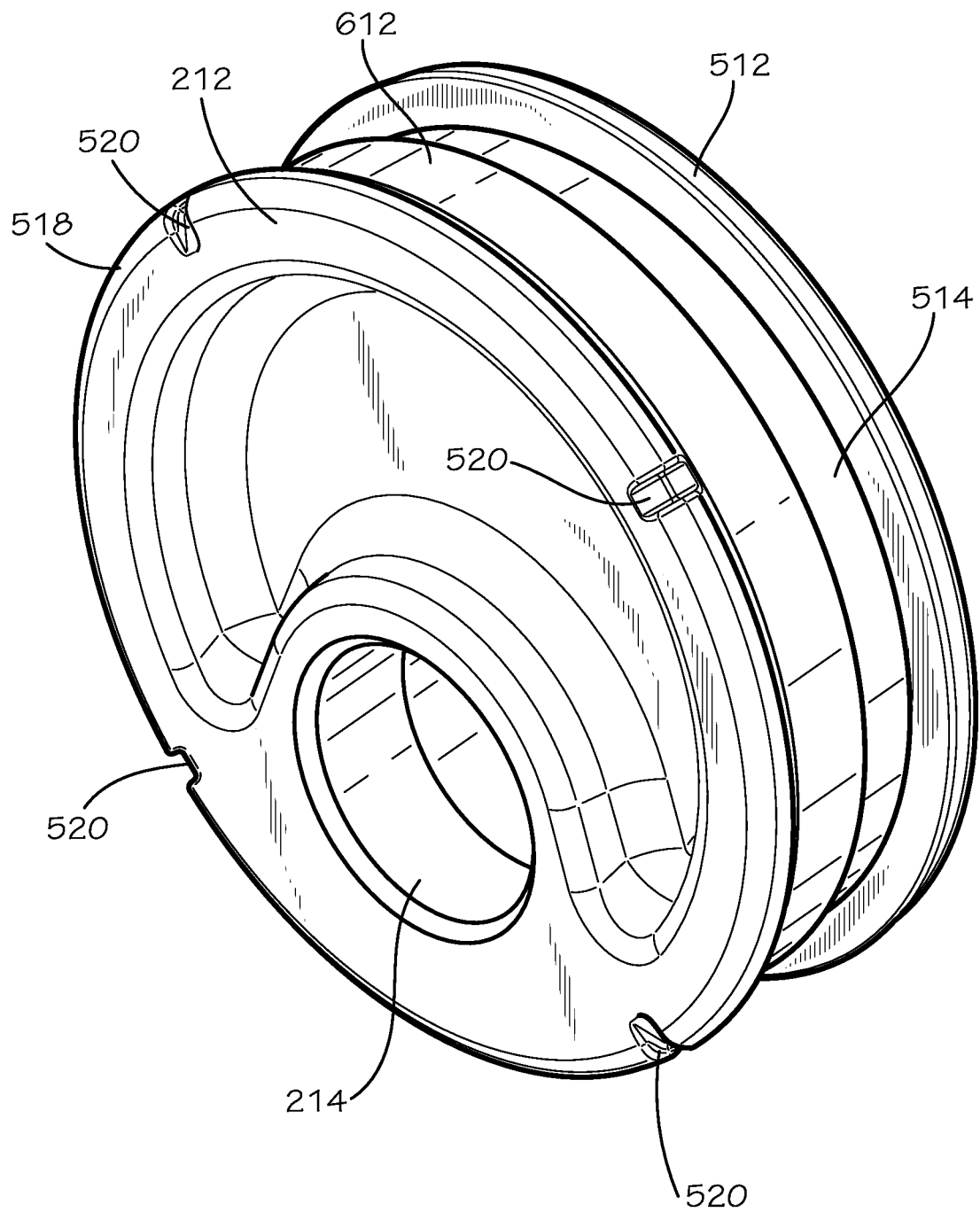
FIG. 12A is a perspective view of the drain cap of FIG. 2.
Figure 12B:
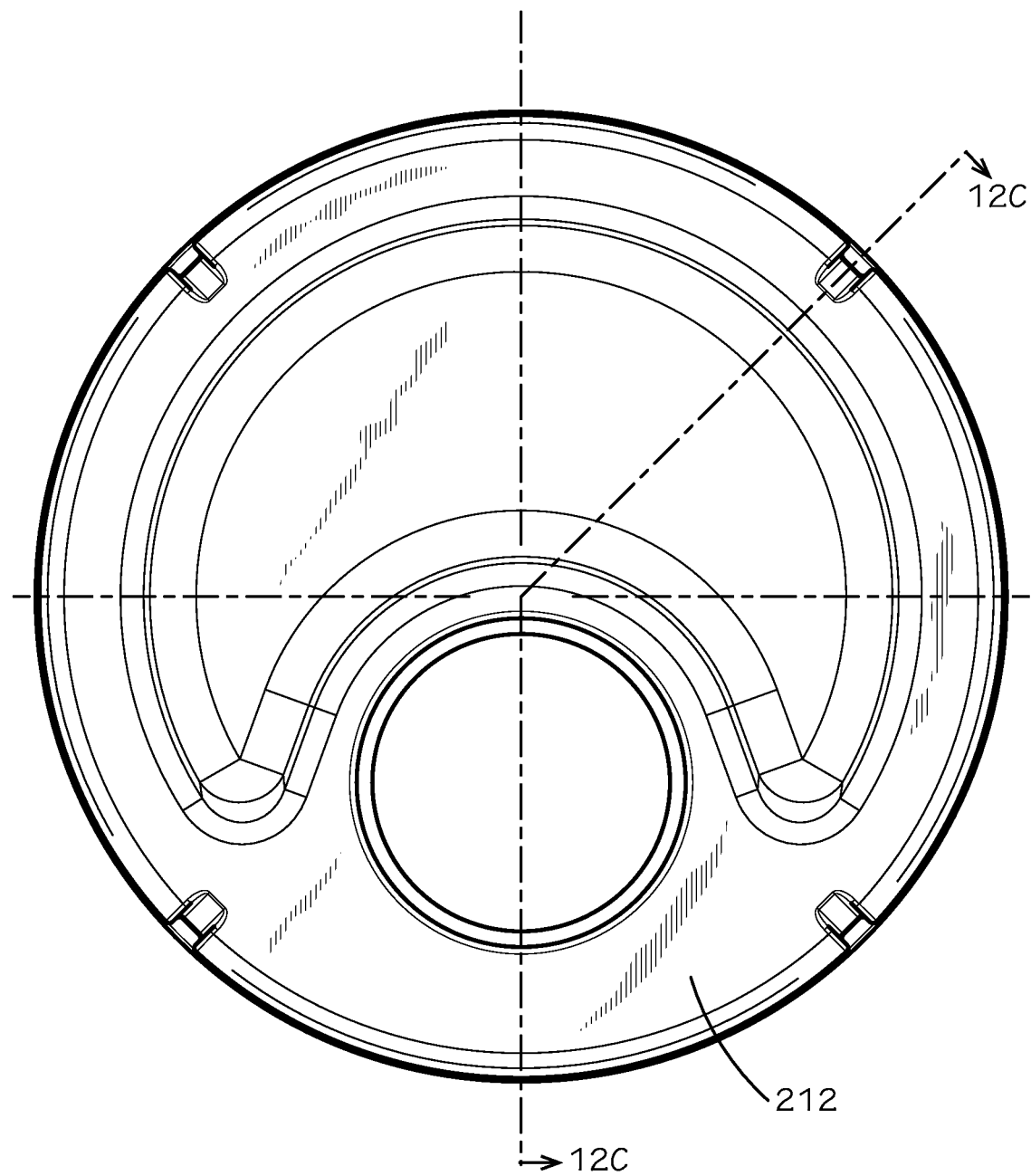
FIG. 12B is an end view of the drain cap of FIG. 2.
Figure 12C:
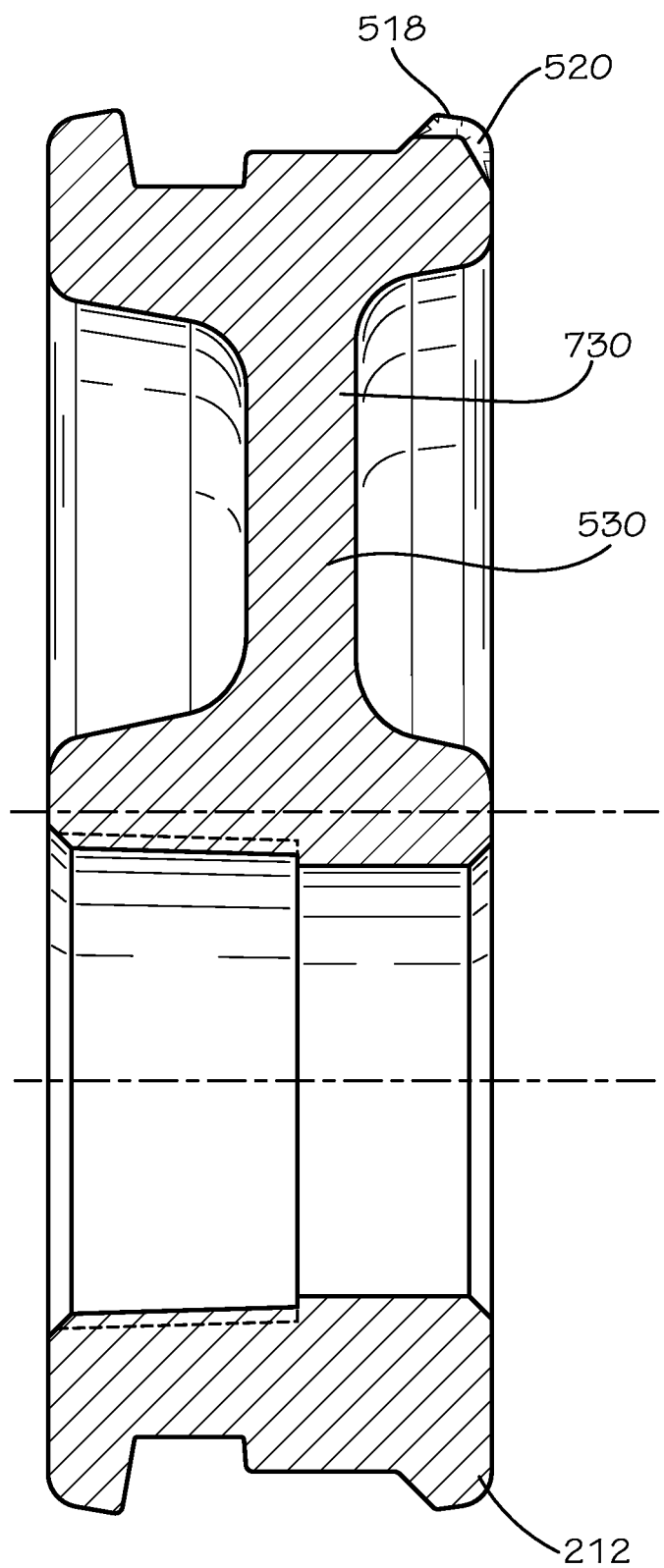
FIG. 12C is a cross-sectional view of the drain cap of FIG. 2 taken along line 12C-12C shown in FIG. 12B.
Figure 12D:
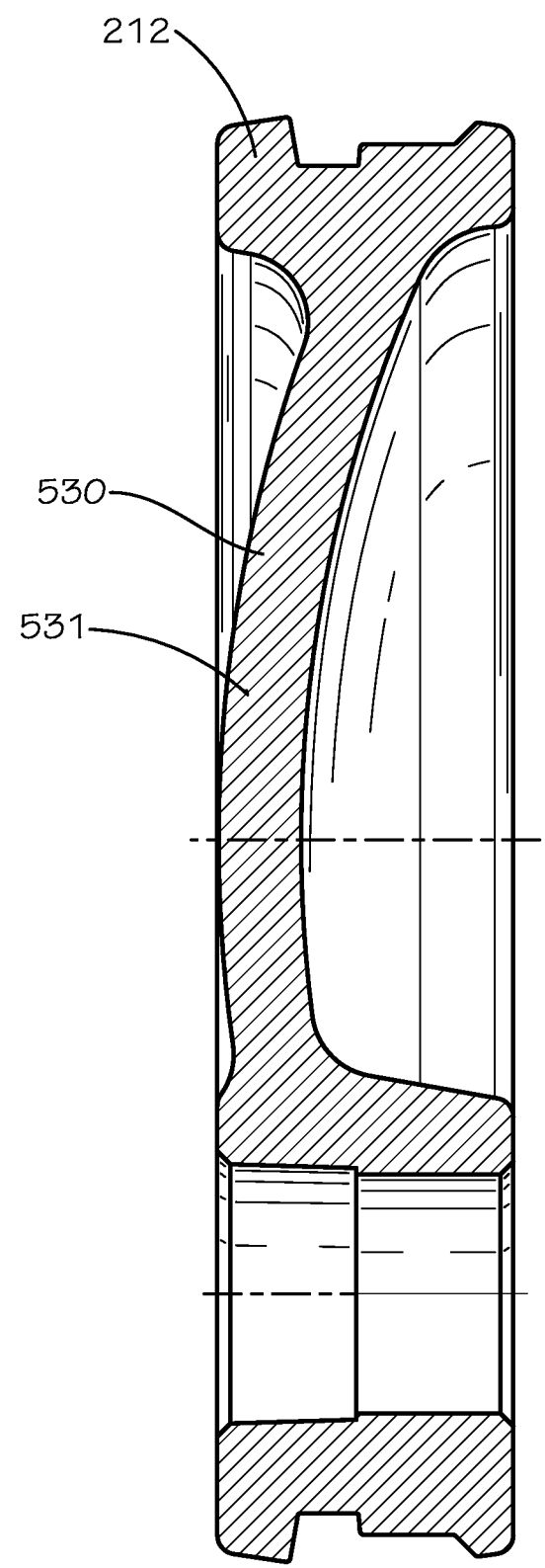
FIG. 12D is a cross-sectional view of another aspect of the drain cap defining a dished web in accordance with another aspect of the present disclosure.
Figure 12E:
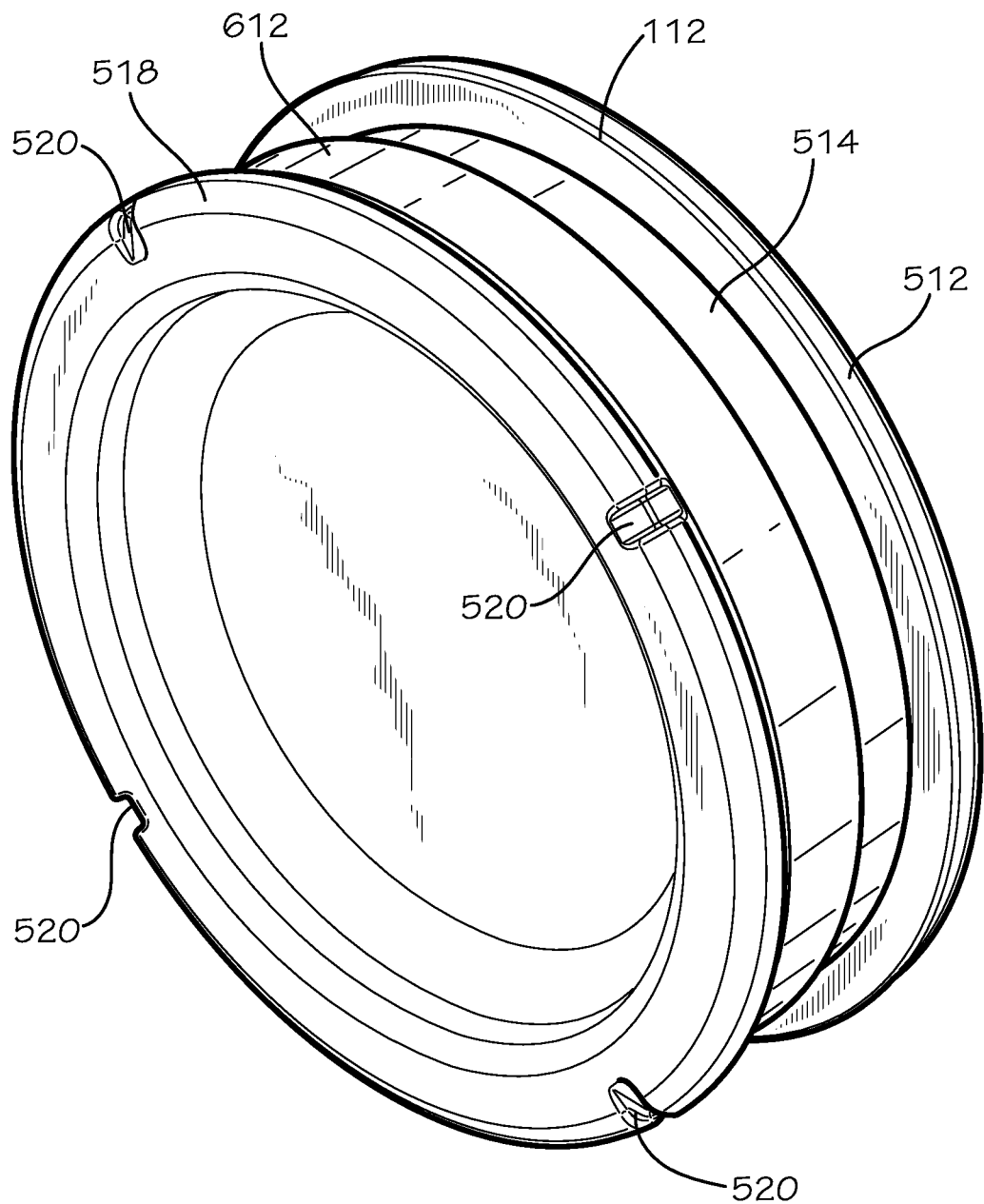
FIG. 12E is a perspective view of another aspect of the cap defining a planar web in accordance with another aspect of the present disclosure.
Figure 12F:
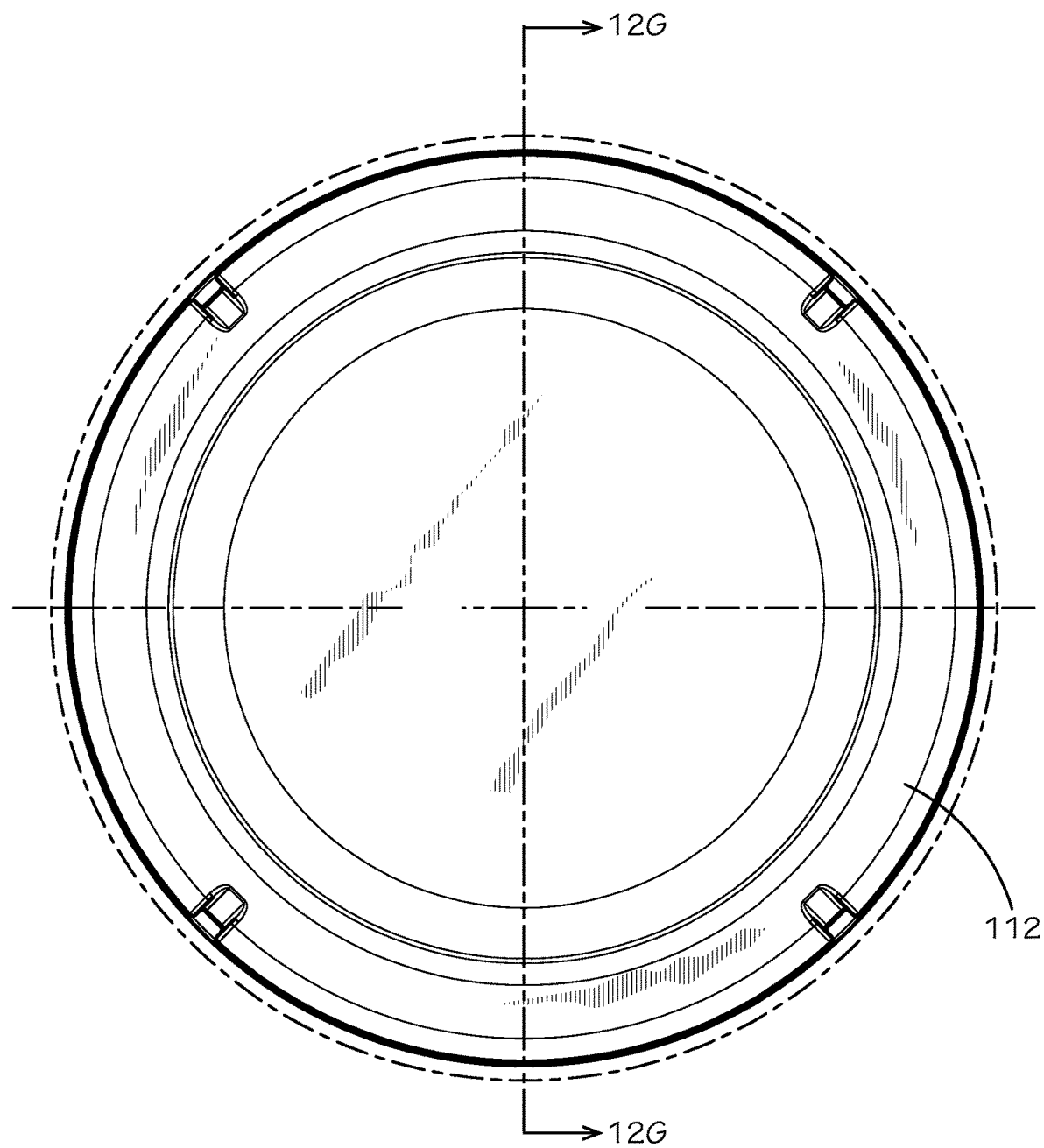
FIG. 12F is an end view of the cap of FIG. 12E.
Figure 12G:
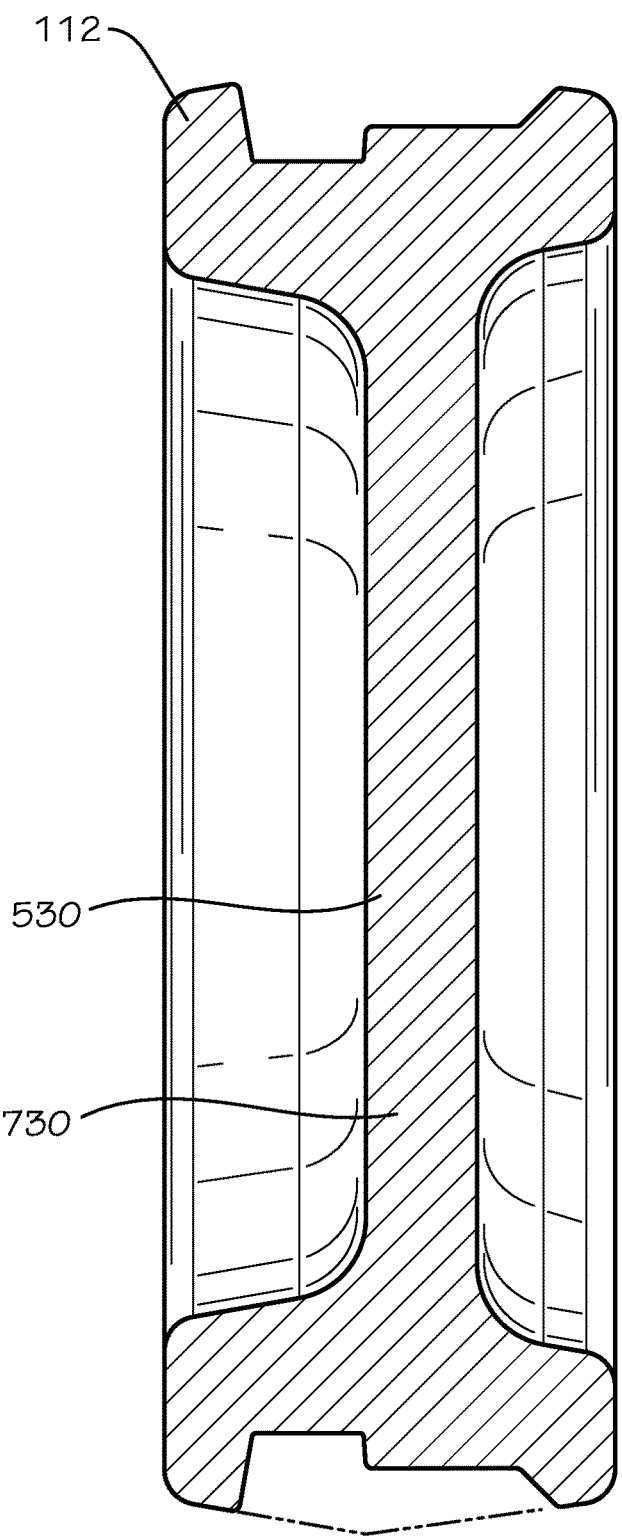
FIG. 12G is a cross-sectional view of the cap of FIG. 12E taken along line 12G-12G shown in FIG. 12F.
Figure 12H:
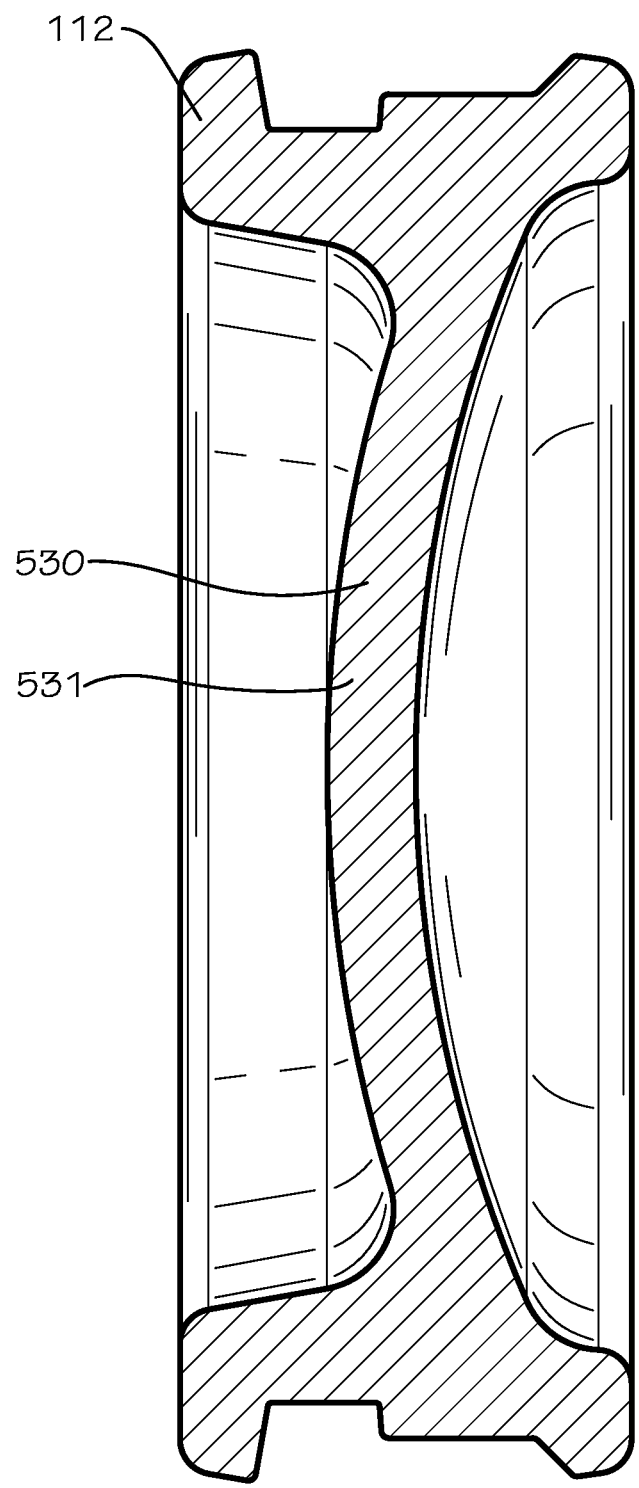
FIG. 12H is a cross-sectional view of the cap of FIG. 2.
Figure 13A:
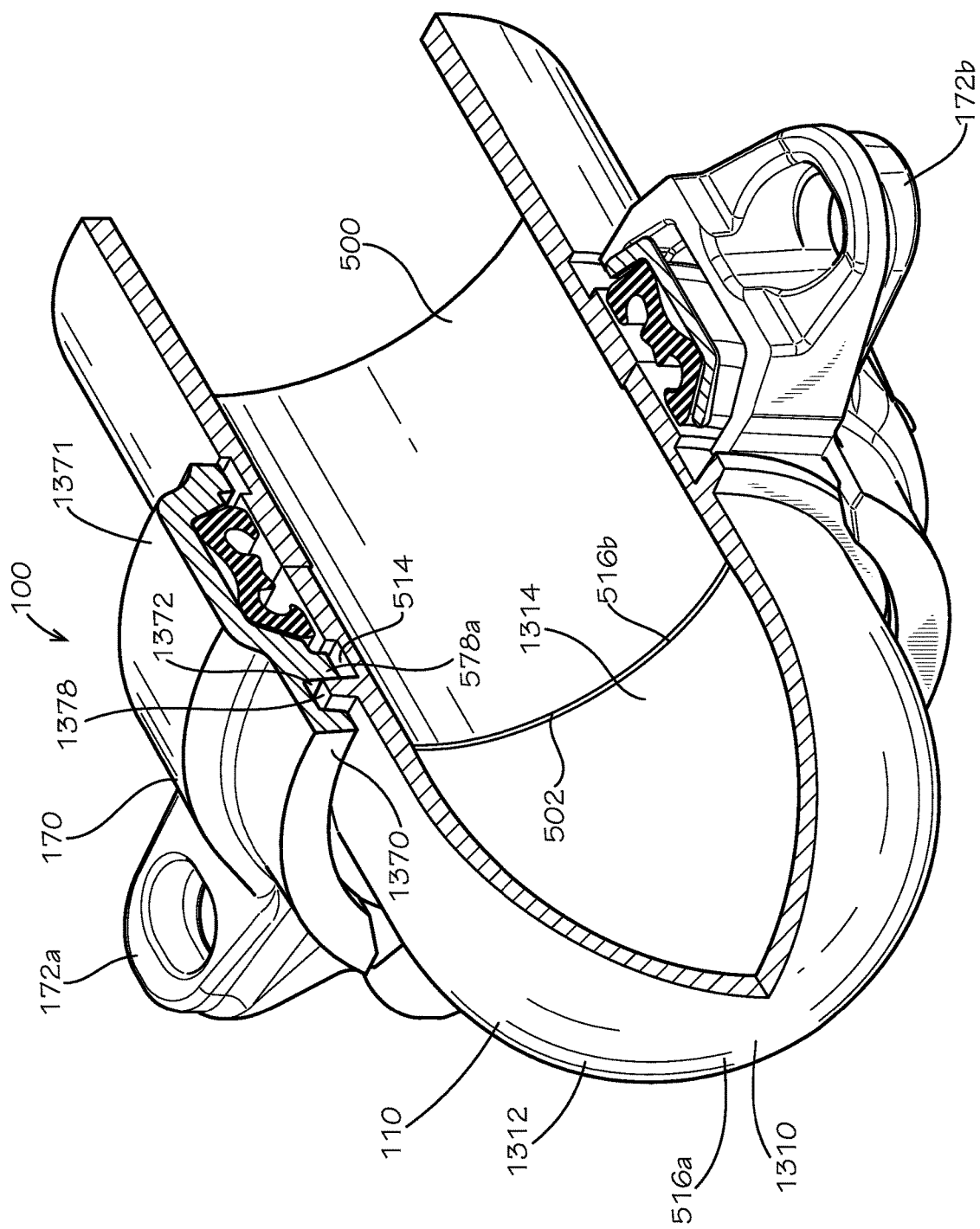
FIG. 13A is a perspective cross-sectional view of the pipe of FIG. 5 and another aspect of the coupling and a domed cap in accordance with another aspect of the present disclosure.
Figure 13B:
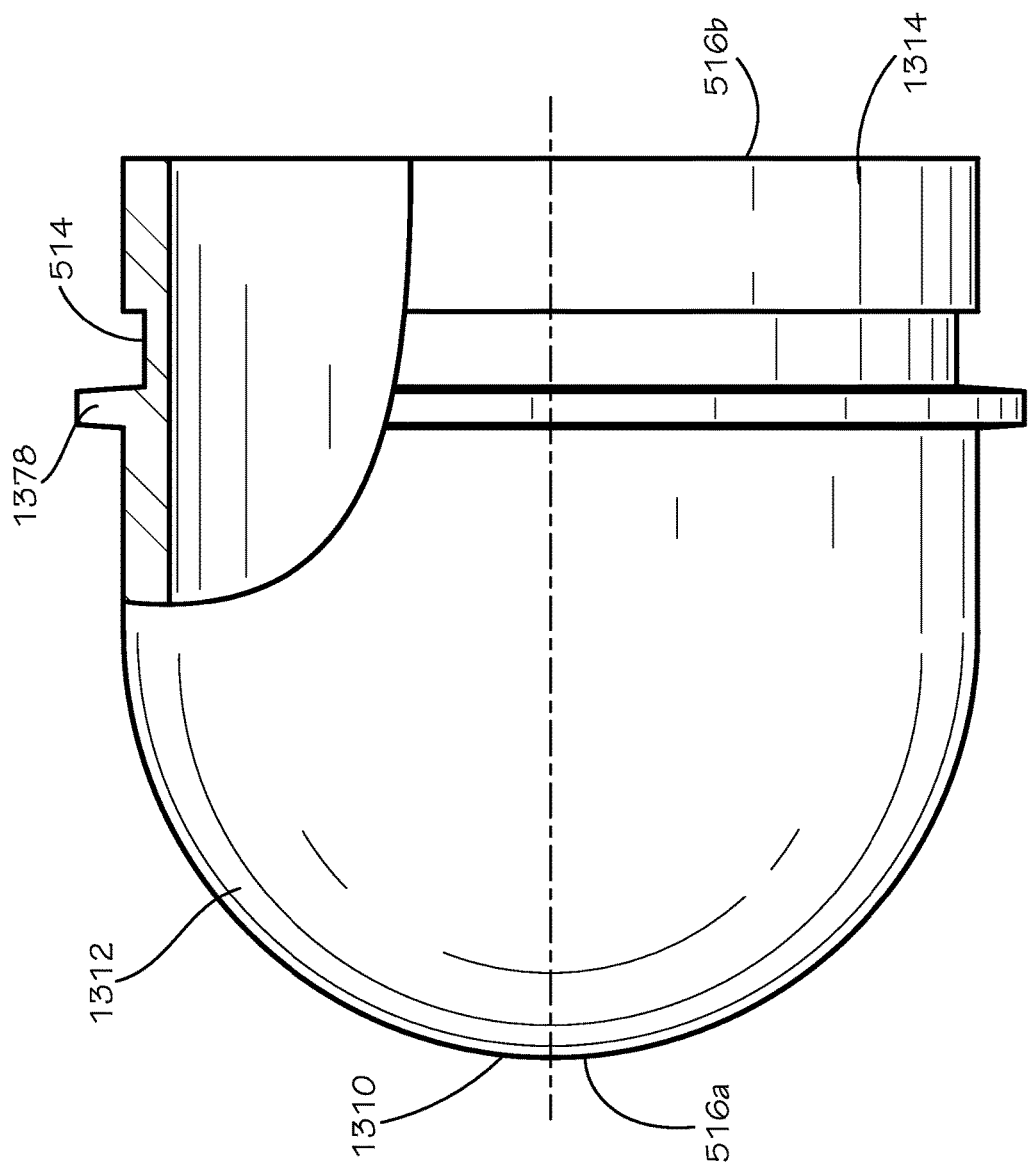
FIG. 13B is a side partial cross-sectional view of the domed cap of FIG. 13A.
Figure 13C:
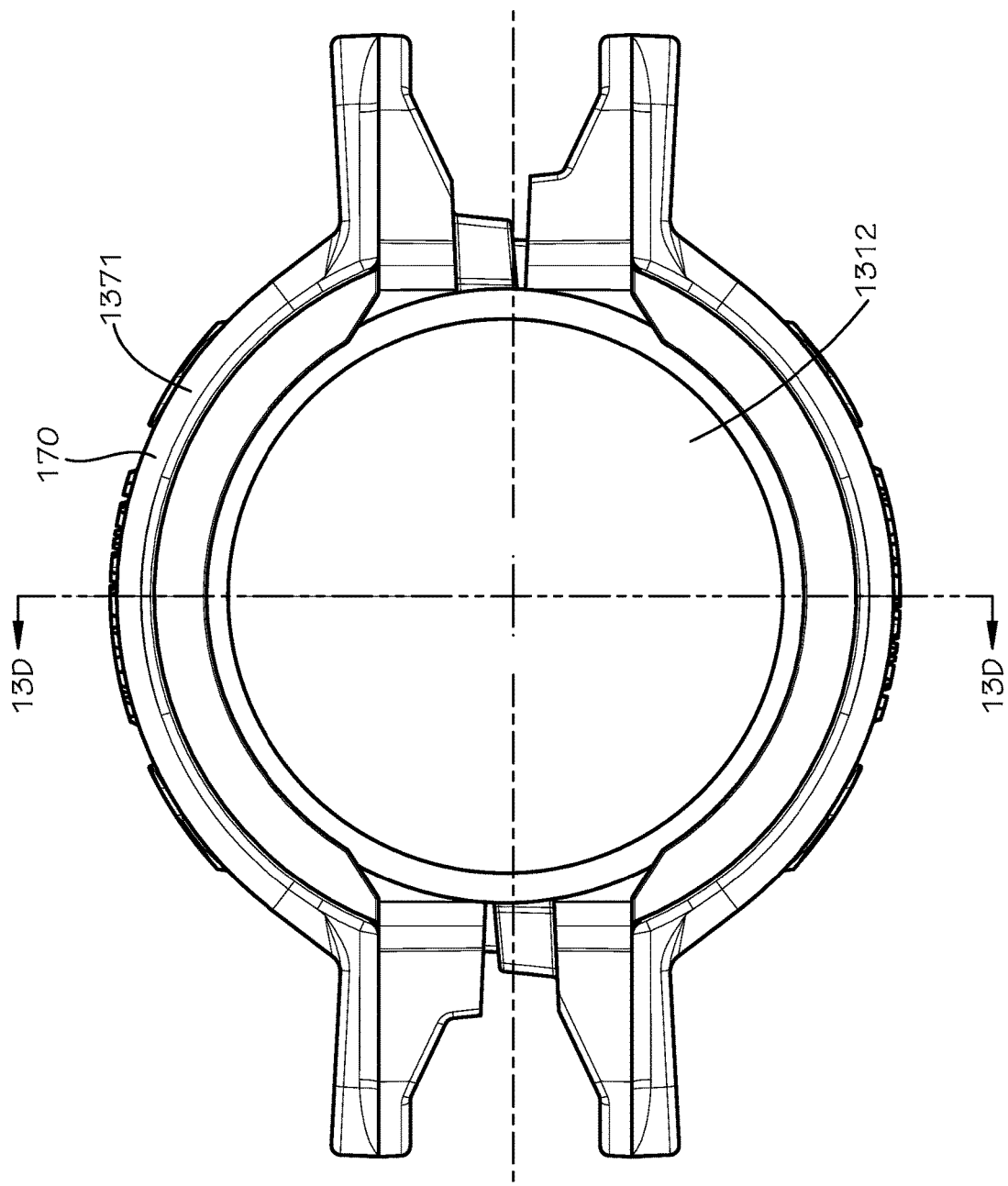
FIG. 13C is an end view of the domed cap and the coupling of FIG. 13A.
Figure 13D:
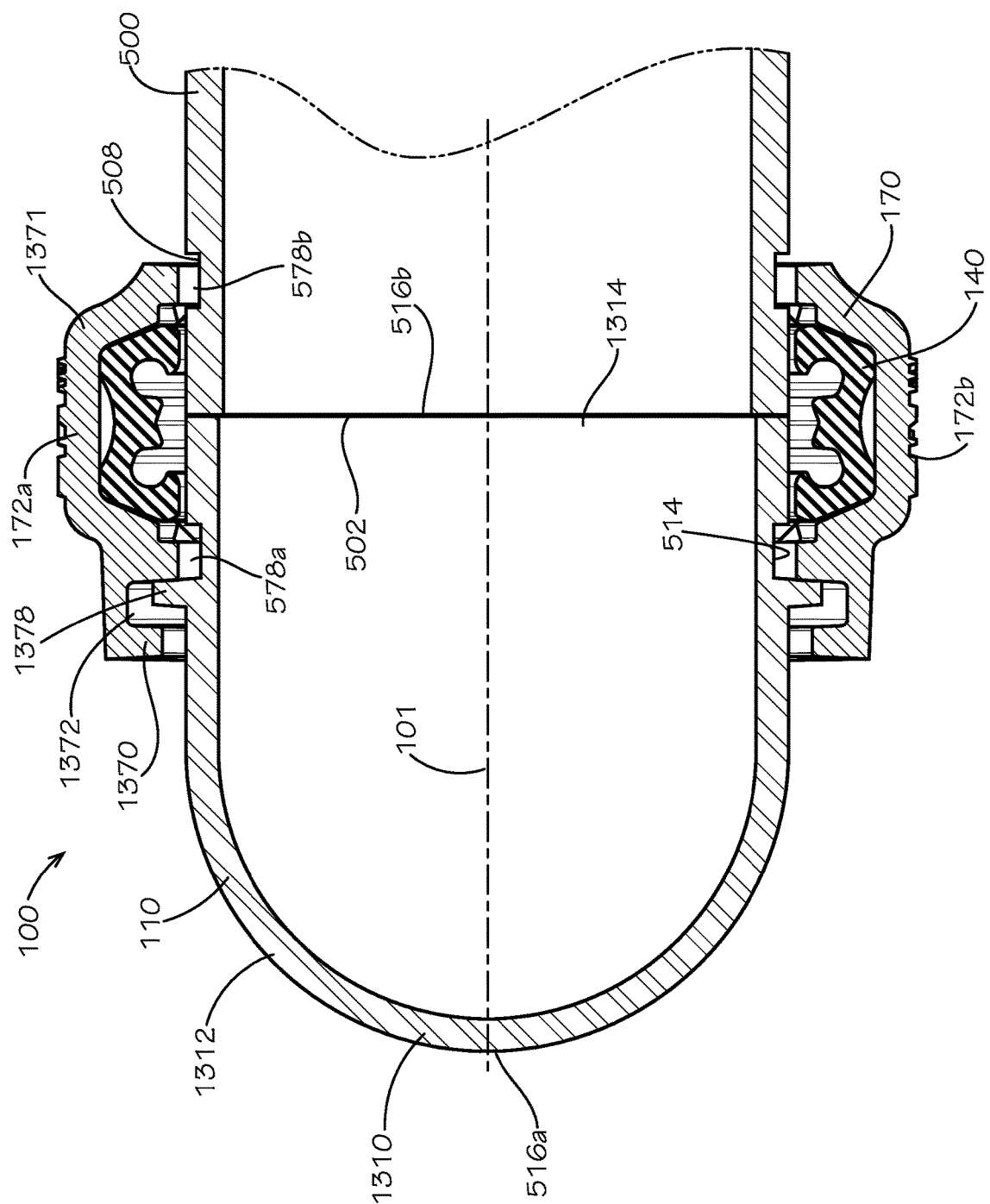
FIG. 13D is a side cross-sectional view of the pipe of FIG. 5 and the domed cap and coupling of FIG. 13A taken along line 13D-13D shown in FIG. 13C.
Figure 13E:
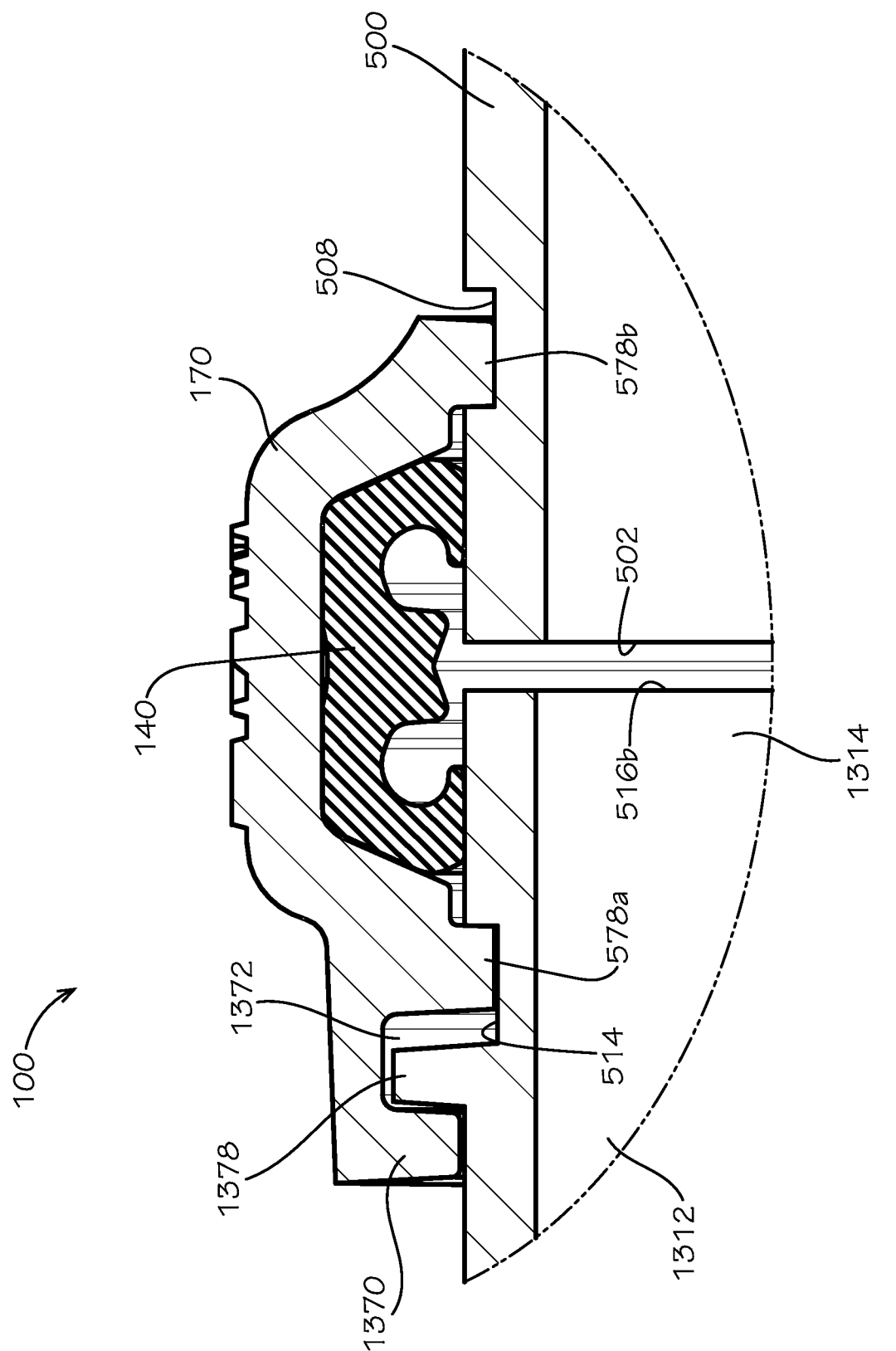
FIG. 13E is a detailed cross-sectional view of the pipe of FIG. 5 and the domed cap and coupling of FIG. 13A.
Figure 14A:
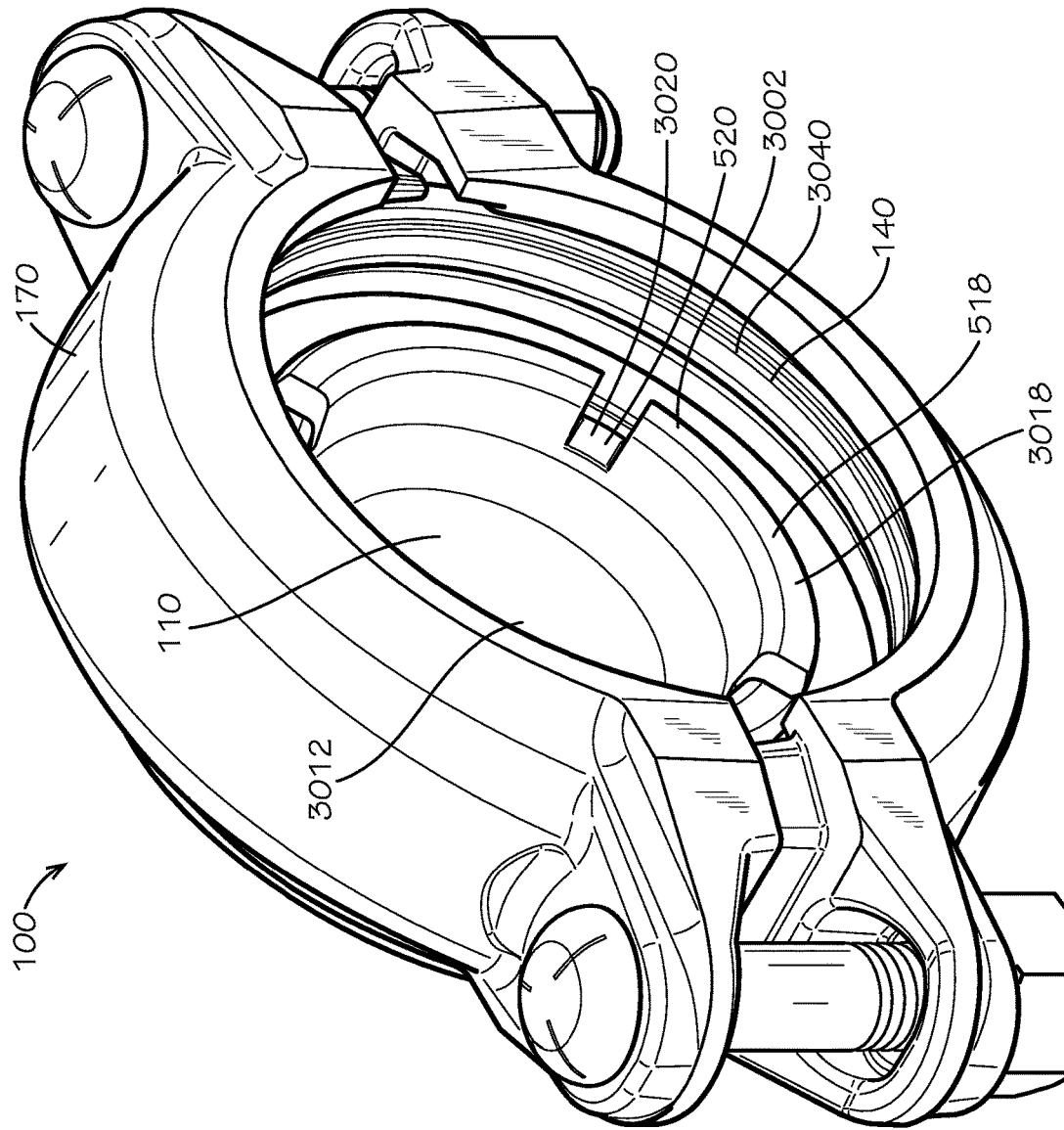
FIG. 14A is a perspective view of another aspect of the pre-assembled coupling comprising a recessed cap fitting in accordance with another aspect of the present disclosure.
Figure 14B:
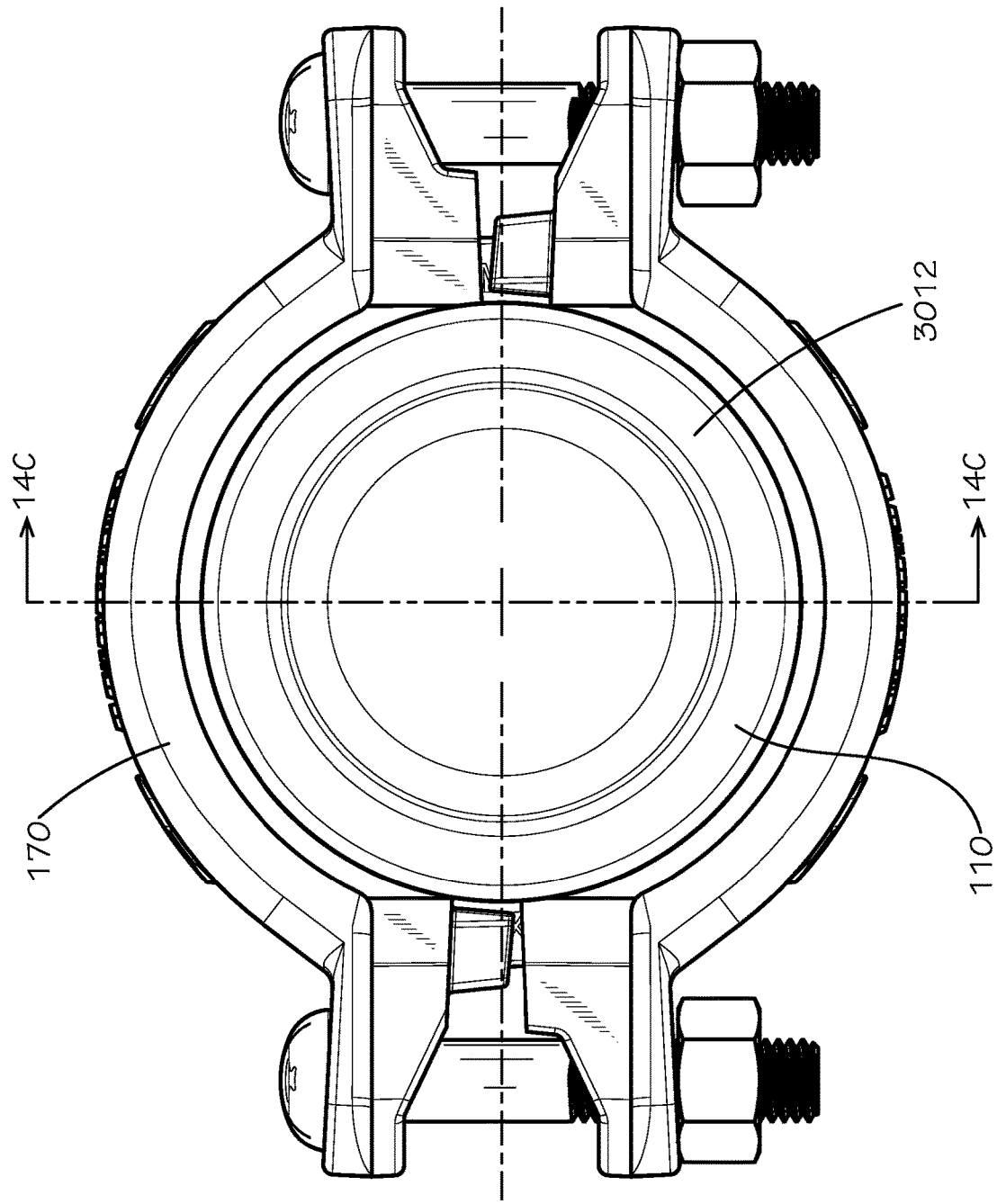
FIG. 14B is an end view of the pre-assembled coupling of FIG. 14A.
Figure 14C:
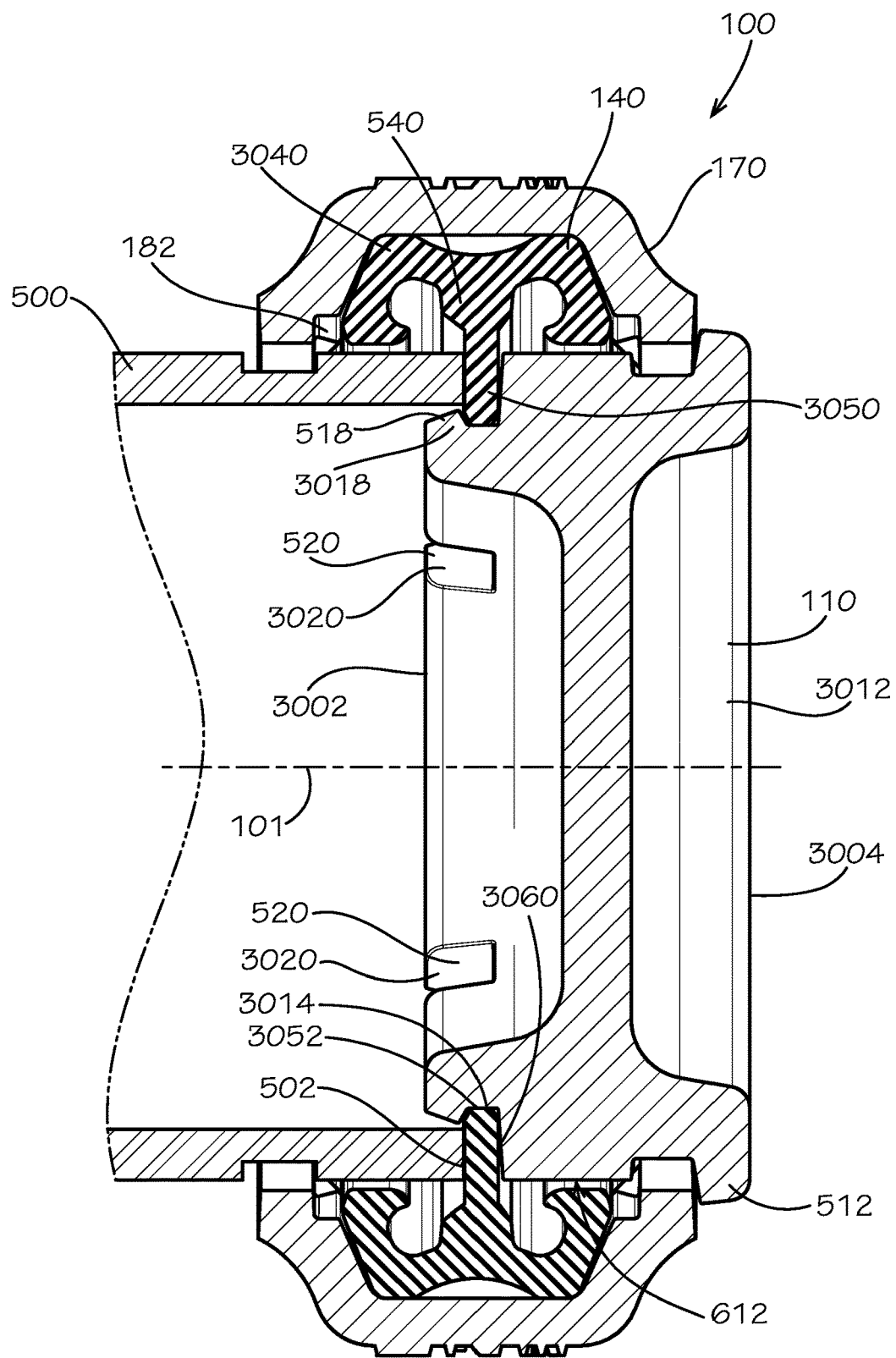
FIG. 14C is a side cross-sectional view of the pre-assembled coupling of FIG. 14A and the pipe of FIG. 5 taken along line 14C-14C shown in FIG. 14B.
Figure 14D:
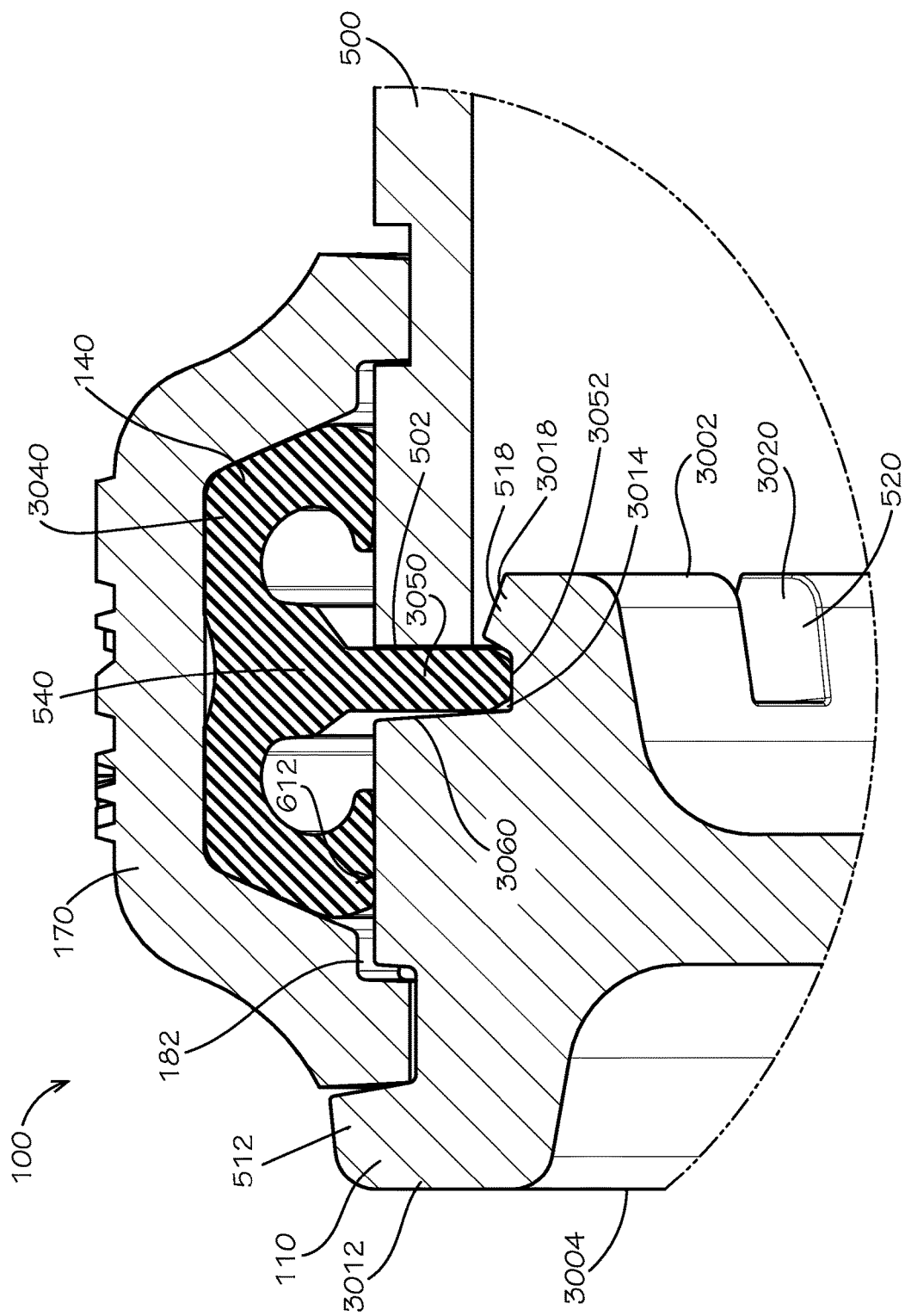
FIG. 14D is a detailed cross-sectional view of the pre-assembled coupling of FIG. 14A and the pipe of FIG. 5.
Figure 15A:
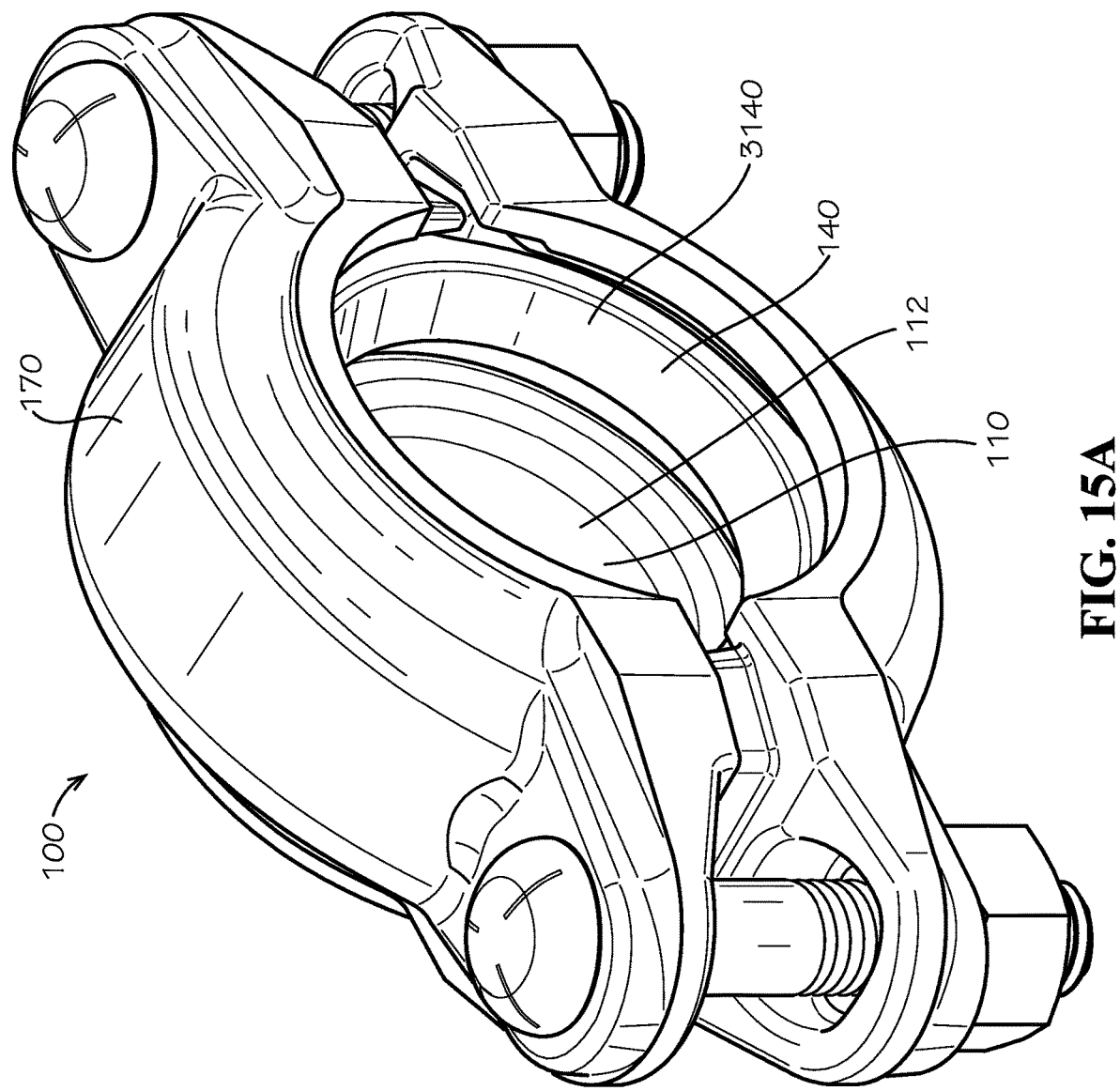
FIG. 15A is a perspective view of another aspect of the pre-assembled coupling comprising a C-style gasket in accordance with another aspect of the present disclosure.
Figure 15B:
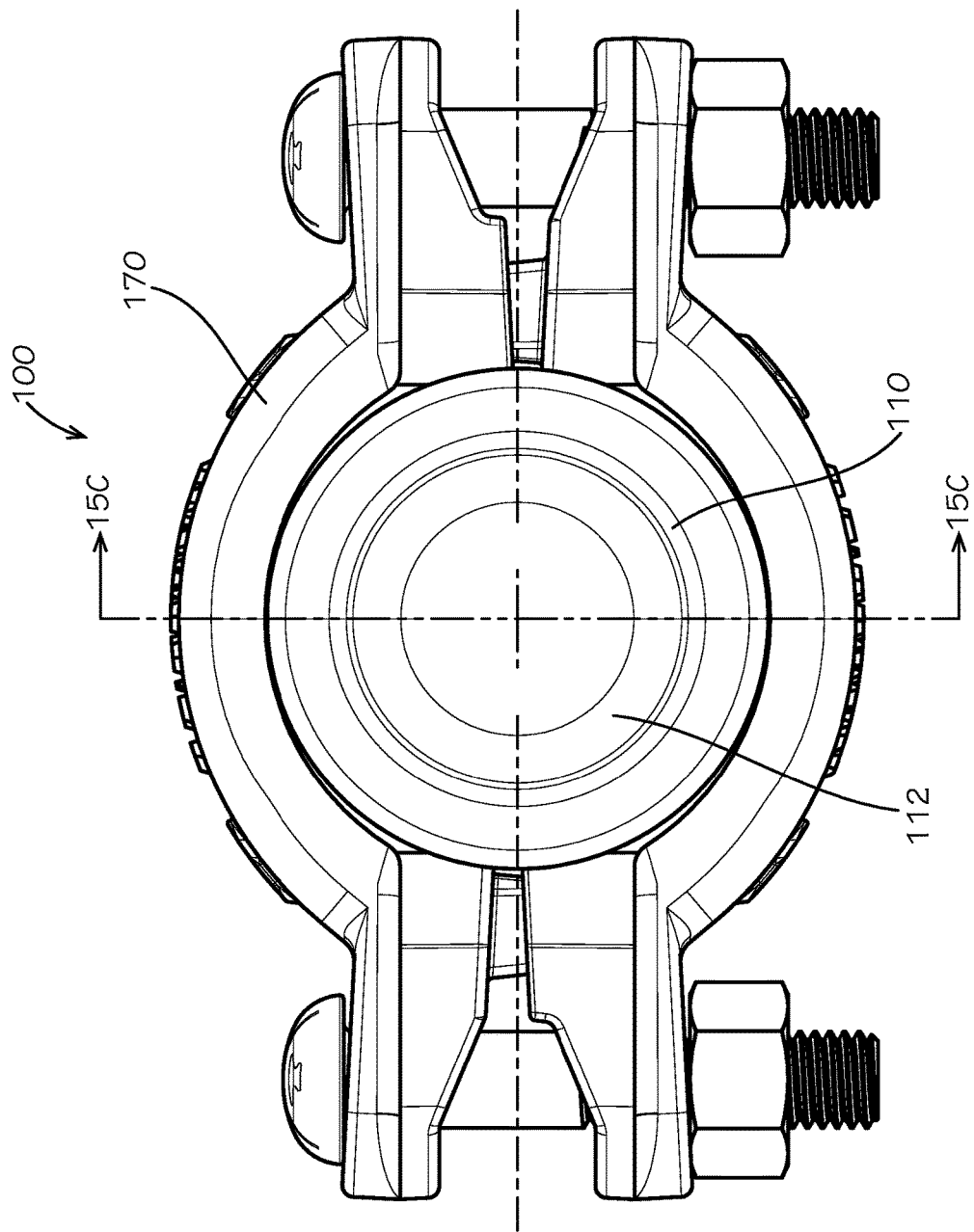
FIG. 15B is an end view of the pre-assembled coupling of FIG. 15A.
Figure 15C:
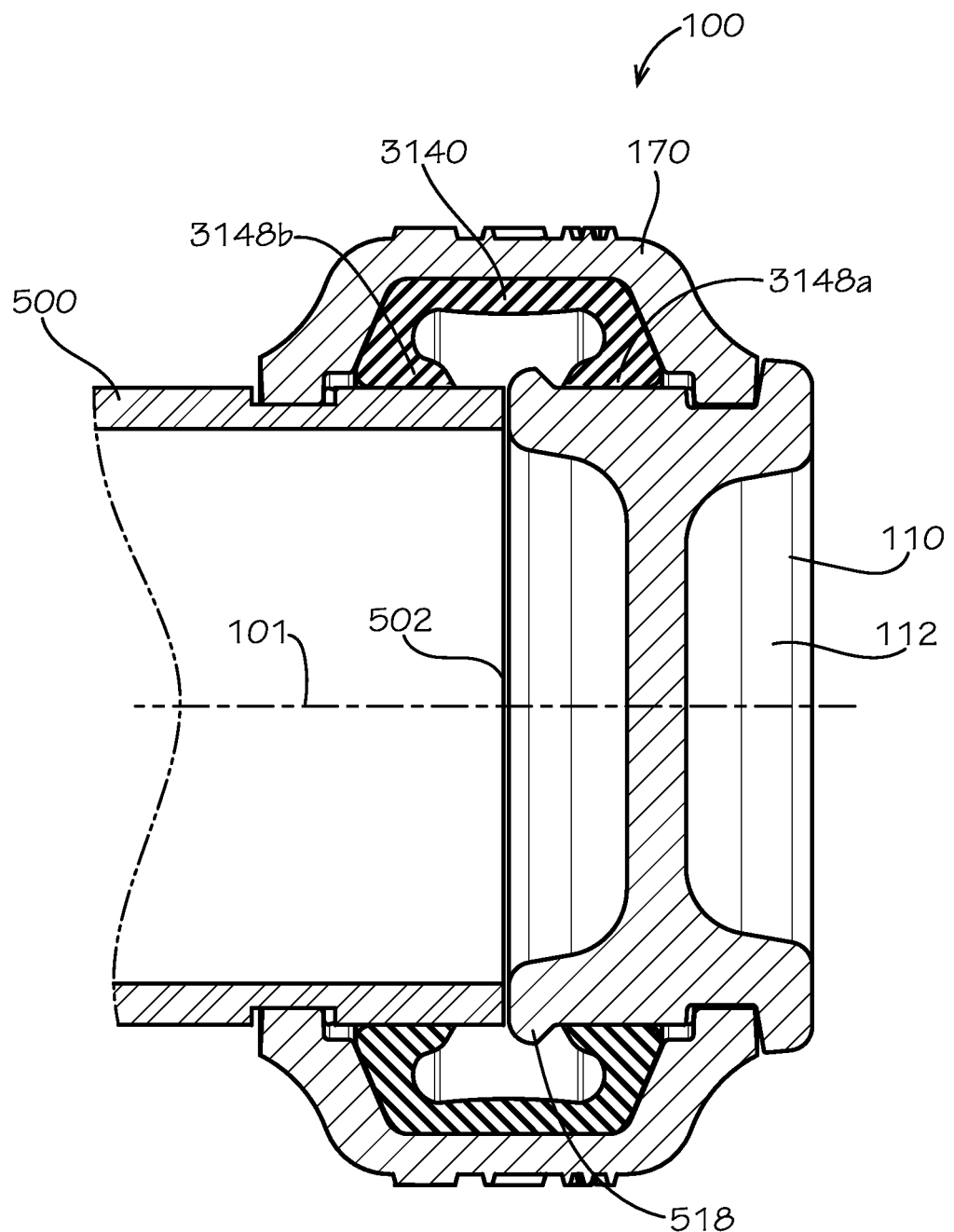
FIG. 15C is a side cross-sectional view of the pre-assembled coupling of FIG. 15A and the pipe of FIG. 5 taken along line 15C-15C shown in FIG. 15B.
Figure 15D:
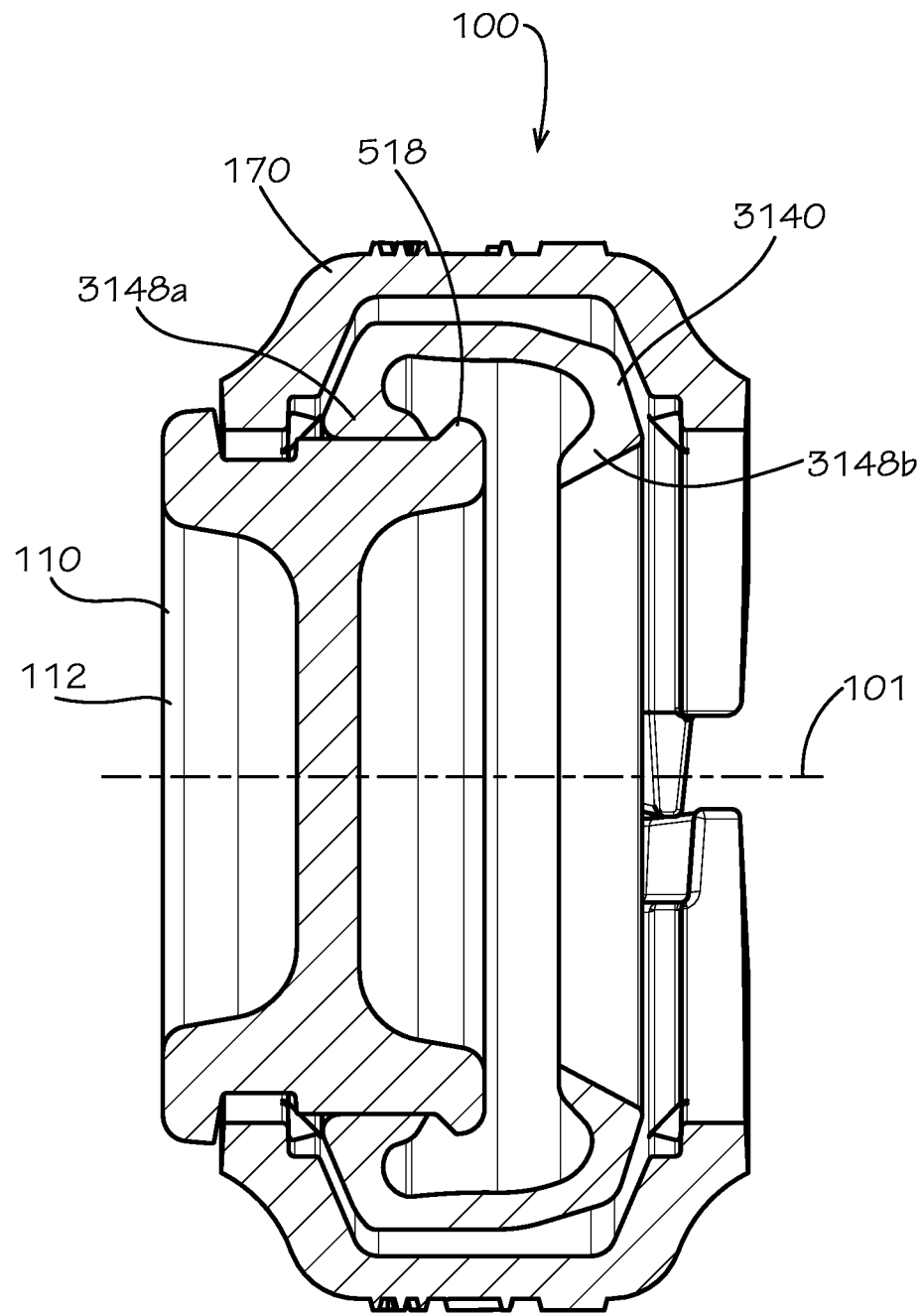
FIG. 15D is a side cross-sectional view of the pre-assembled coupling of FIG. 15A taken along line 15C-15C shown in FIG. 15B.

FIG. 11 is a detail cross-sectional view of another aspect of the pressure relief channels 520 of FIG. 9 taken along line C-C shown in FIG. 9. Rather than defining the angled surface 1020 as shown in FIG. 10, the pressure relief channel 520 can define a radial surface 1120 which can be substantially perpendicular to the axis 101 (shown in FIG. 9) and the axial surface 1018. In the present aspect, the radial surface 1120 can be substantially parallel to the inner end 516*b*. In the present aspect, the radial surface 1120 can extend completely across the inner end 516*b* of the annular ring 532 of the cap 112.

FIGS. 12A-12H show multiple views of the cap 112 of FIG. 1 and the drain cap 212 of FIG. 2. Each of the cap 112 and the drain cap 212 can define either the dished web 531 or the planar web 730 or any other suitable shape.

FIGS. 13A-13E show another aspect of the pre-assembled coupling assembly 100 wherein the pipe fitting 110 is a domed cap 1312. The domed cap 1312 can define a domed portion 1310 disposed at the outer end 516*a* of the domed cap 1312 and a cylindrical portion 1314 disposed at the inner end 516*b* of the domed cap 1312. The domed cap 1312 can define a secondary key 1378 extending radially outward from cylindrical portion 1314. The secondary key 1378 can be disposed adjacent to the groove 514, and the groove 514 can be disposed between the secondary key 1378 and the inner end 516*b*.

The coupling 170 can comprise a grooved housing 1371 comprising another aspect of the first segment 172*a* and the second segment 172*b*. The grooved housing 1371 can define a secondary shoulder 1370 attached to the first ridge 578*a*. A secondary groove 1372 can be defined between the secondary shoulder 1370 and the first ridge 578*a*. The secondary key 1378 can be received within the secondary groove 1372 to retain the coupling 170 on the domed cap 1312.

During assembly, the coupling 170 in the relaxed position can be slipped over the end 502 of the pipe 500, and the end 502 can be positioned in facing engagement with the inner end 516*b* of the domed cap 1312. With the end 502 in facing engagement with the inner end 516*b*, the secondary key 1378 can be positioned adjacent to the first ridge 578*a*. Once the coupling 170 is in the tensioned position and the pipe 500 is pressurized, the domed cap 1312 can pull away from the end 502 of the pipe 500 due to end cap forces from pressurized fluids transmitted by the pipe 500. Contact between the secondary key 1378 and the secondary shoulder 1370 can limit axial movement of the domed cap 1312 relative to the coupling 170 and the pipe 500.

FIGS. 14A-14D show multiple views of another aspect of the pre-assembled coupling assembly 100. The pipe fitting 110 can be a recessed cap fitting 3012, which can define a recessed raised-lip end 3002 and an outer lip end 3004. The outer lip end 3004 can define the outer lip 512, and the outer lip end 3004 can be disposed axially outward from the coupling 170 with respect to the axis 101. The recessed cap fitting 3012 can define a shoulder 3060 disposed between the sealing surface 612 and the raised lip 518. The shoulder 3060 can extend radially inward from the sealing surface 612 with respect to the axis 101. The recessed cap fitting 3012 can further define a groove 3014 axially disposed between the raised lip 518 and the shoulder 3060 with respect to the axis 101. The groove 3014 can extend radially inward from the raised lip 518 with respect to the axis 101.

In the present aspect, the raised lip 518 can be a recessed raised lip 3018 disposed radially inward from the sealing surface 612 with respect to the axis 101. The pressure relief channels 520 can be recessed pressure relief channels 3020 which can radially extend through the recessed raised lip 3018 and can axially extend between the recessed raised-lip end 3002 and the shoulder 3060 with respect to the axis 101.

In the present aspect, the gasket 140 can be a rimmed gasket 3040. The rimmed gasket 3040 can define an inner rim 3050 which can extend radially inward from the center ridge 540 of the rimmed gasket 3040. The inner rim 3050 can define a radially inner end 3052. With the recessed raised-lip end 3002 disposed within the coupling bore 182, the inner rim 3050 can be positioned adjacent to the shoulder 3060. The radially inner end 3052 of the inner rim 3050 can be received within the groove 3014 of the recessed cap fitting 3012, and the recessed raised lip 3018 can radially overlap with the radially inner end 3052 of the inner rim 3050 with respect to the axis 101. Radial overlap of the recessed raised lip 3018 and the radially inner end 3052 can retain the coupling 170 on the recessed cap fitting 3012 when the coupling 170 is in the relaxed position.

The end 502 of the pipe 500 can also be inserted into the coupling bore 182 with the coupling 170 in the relaxed position. With the end 502 of the pipe 500 disposed within the coupling bore 182, the inner rim 3050 can extend axially inwards from the rimmed gasket 3040 between the end 502 of the pipe 500 and the shoulder 3060, thereby preventing contact between the end 502 of the pipe 500 and the shoulder 3060. The recessed raised-lip end 3002 can be inserted into the end 502 of the pipe 500. The recessed raised lip 3018 can define a tapered pipe alignment surface which can facilitate insertion of the recessed raised-lip end 3002 of the recessed cap fitting 3012 into the end 502 of the pipe 500.

FIGS. 15A-15D show multiple views of another aspect of the pre-assembled coupling assembly 100. The coupling 170 of the present aspect of the pre-assembled coupling assembly 100 can comprise a C-style gasket 3140 which may not define the center ridge 540 (shown in FIG. 5) of the gasket 140 (shown in FIG. 5). The C-style gasket 3140 can define a pair of sealing ridges 3148*a,b*. In the present aspect, the sealing ridges 3148*a,b* can extend axially and radially inward relative to the axis 101, as demonstrated by sealing ridge 3148*b*, when the C-style gasket 3140 is in a relaxed and uncompressed state. Once the end 502 of the pipe 500 is inserted into the coupling 170, the sealing ridge 3148*b* can stretch over the end 502 of the pipe 500 and rotate radially outward with respect to the axis 101.

Figure 16A:
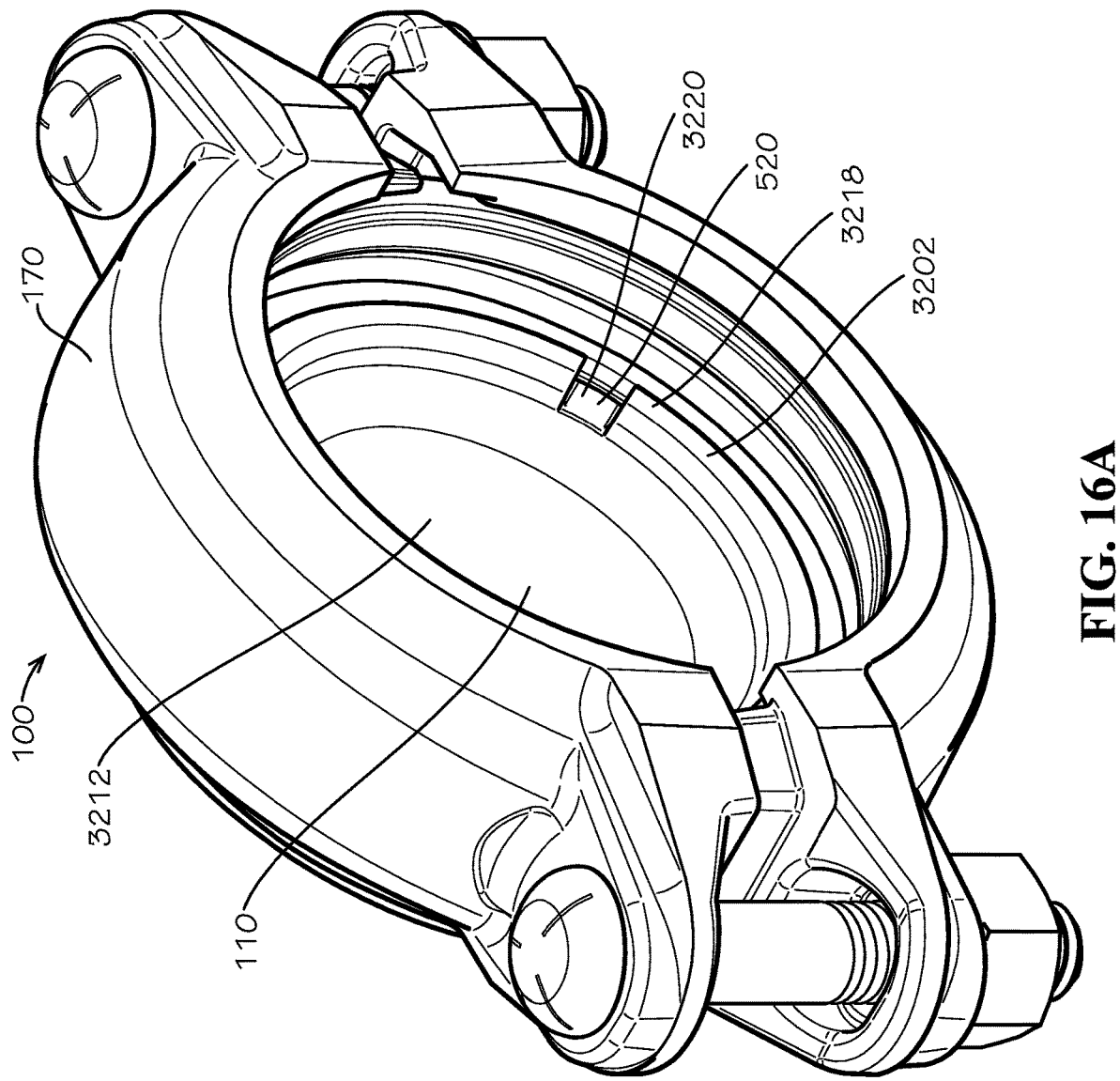
FIG. 16A is a perspective view of another aspect of the pre-assembled coupling comprising a grooved pipe cap in accordance with another aspect of the present disclosure.
Figure 16B:
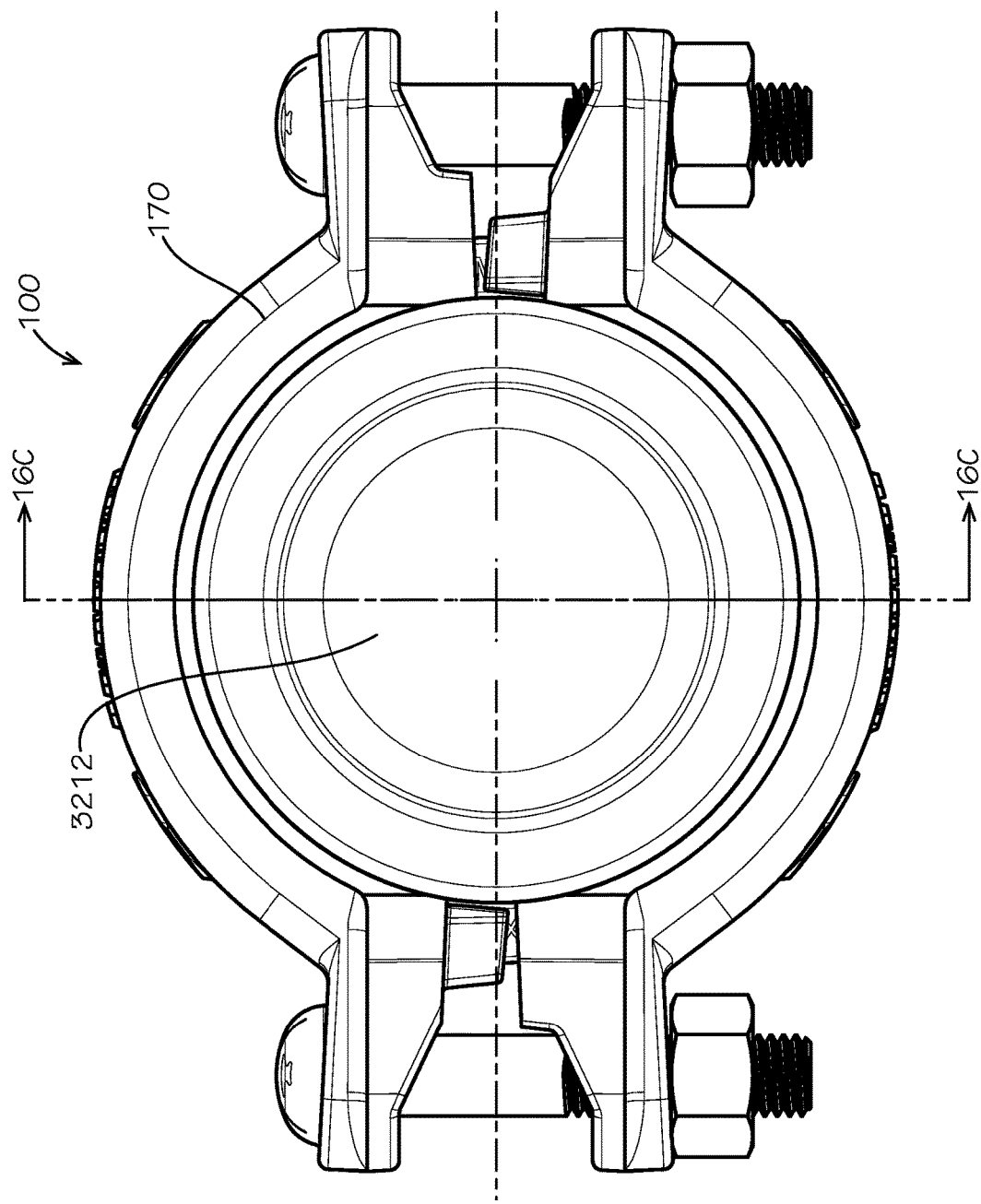
FIG. 16B is an end view of the pre-assembled coupling of FIG. 16A.
Figure 16C:
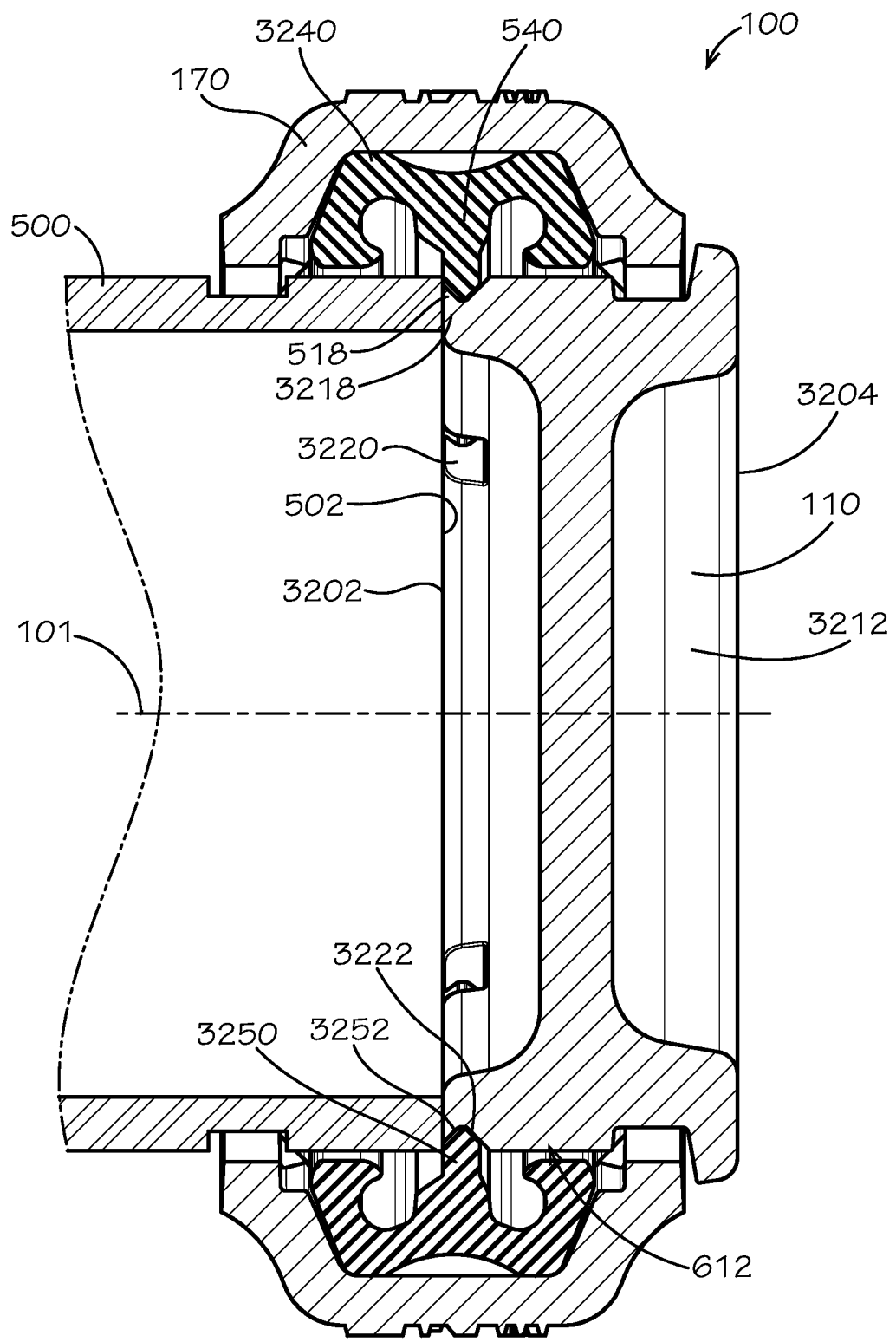
FIG. 16C is a side cross-sectional view of the pre-assembled coupling of FIG. 16A taken along line 16C-16C shown in FIG. 16B.

FIGS. 16A-16C show multiple views of another aspect of the pre-assembled coupling assembly 100 wherein the pipe fitting 110 can be a grooved pipe cap 3212. The grooved pipe cap 3212 can define an inner end 3202 and an outer end 3204, and the inner end 3202 can be disposed opposite from the outer end 3204 on the grooved pipe cap 3212. A circumferential groove 3222 can be defined at the inner end 3202, and the circumferential groove 3222 can extend around a circumference of the grooved pipe cap 3212. The circumferential groove 3222 can be defined extending radially inward from the sealing surface 612. In the present aspect, the circumferential groove 3222 can define a triangular cross-sectional shape; however in other aspects, the circumferential groove 3222 can define a different cross-sectional shape, such as semi-circular, rectangular, or any other suitable shape. In the present aspect, the raised lip 518 can be a recessed raised lip 3218 disposed radially inward from the sealing surface 612 with respect to the axis 101. The inner end 3202 can also define pressure relief channels 3220 extending radially through the inner end 3202 and intersecting the circumferential groove 3222 with respect to the axis 101. With the end 502 of the pipe 500 inserted into the coupling 170, the end 502 of the pipe 500 can contact the inner end 3202 of the grooved pipe cap 3212.

The coupling 170 can comprise a modified rimmed gasket 3240, which can define an inner rim 3250 which can extend radially inward from the center ridge 540 with respect to the axis 101. A radially inner end 3252 of the inner rim 3250 can define a cross-sectional shape formed complimentary to the cross-sectional shape of the circumferential groove 3222. In the present aspect, the radially inner end 3252 can define the triangular cross-sectional shape for example and without limitation. The radially inner end 3252 of the inner rim 3250 can engage the circumferential groove 3222, and engagement between the radially inner end 3252 and the circumferential groove 3222 can retain the coupling 170 on the inner end 3202 of the grooved pipe cap 3212 when the coupling 170 is in the relaxed position.

Figure 17A:
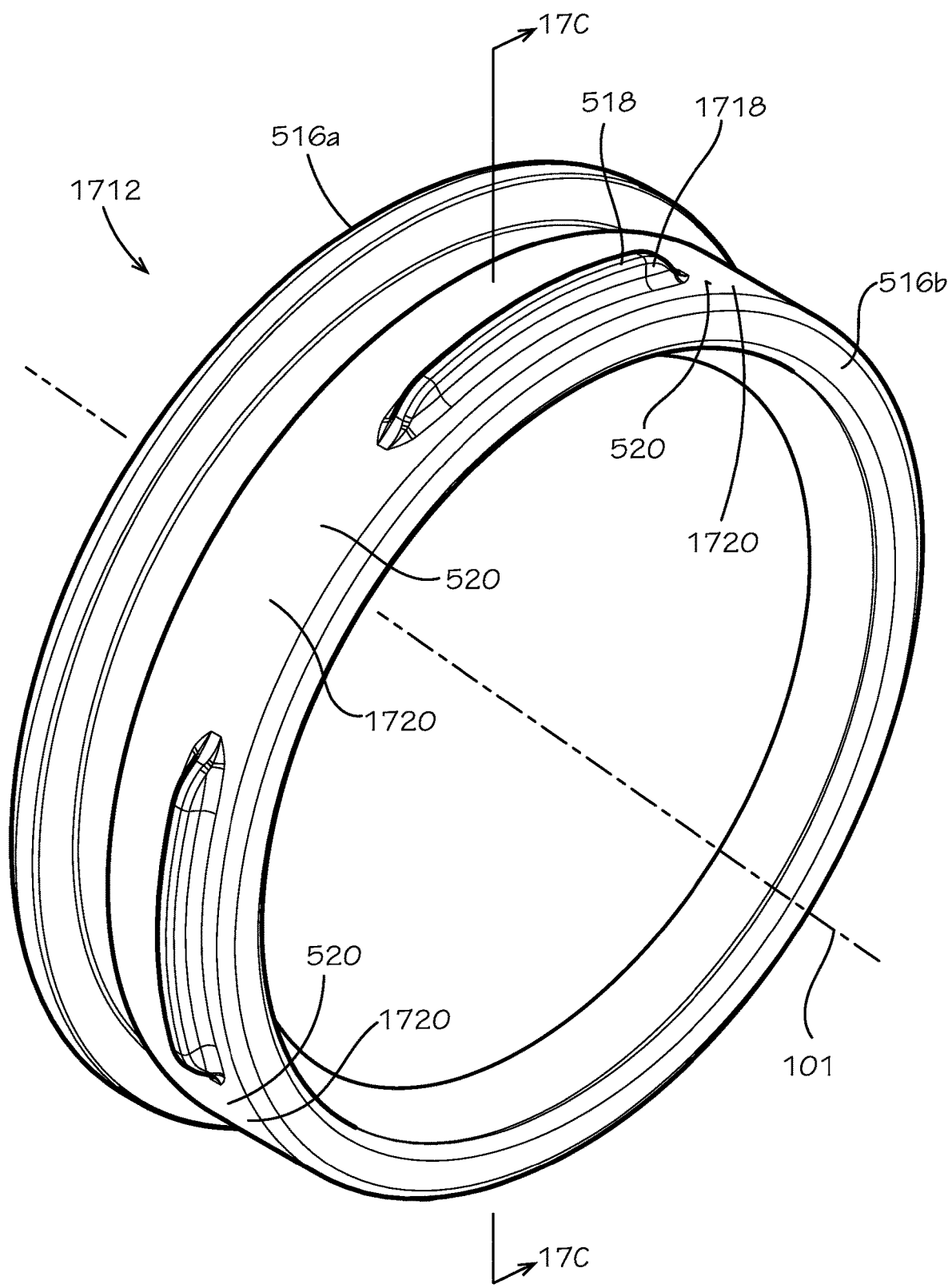
FIG. 17A is a perspective view of another aspect of the cap wherein the cap is a stop lip cap in accordance with another aspect of the present disclosure.
Figure 17B:
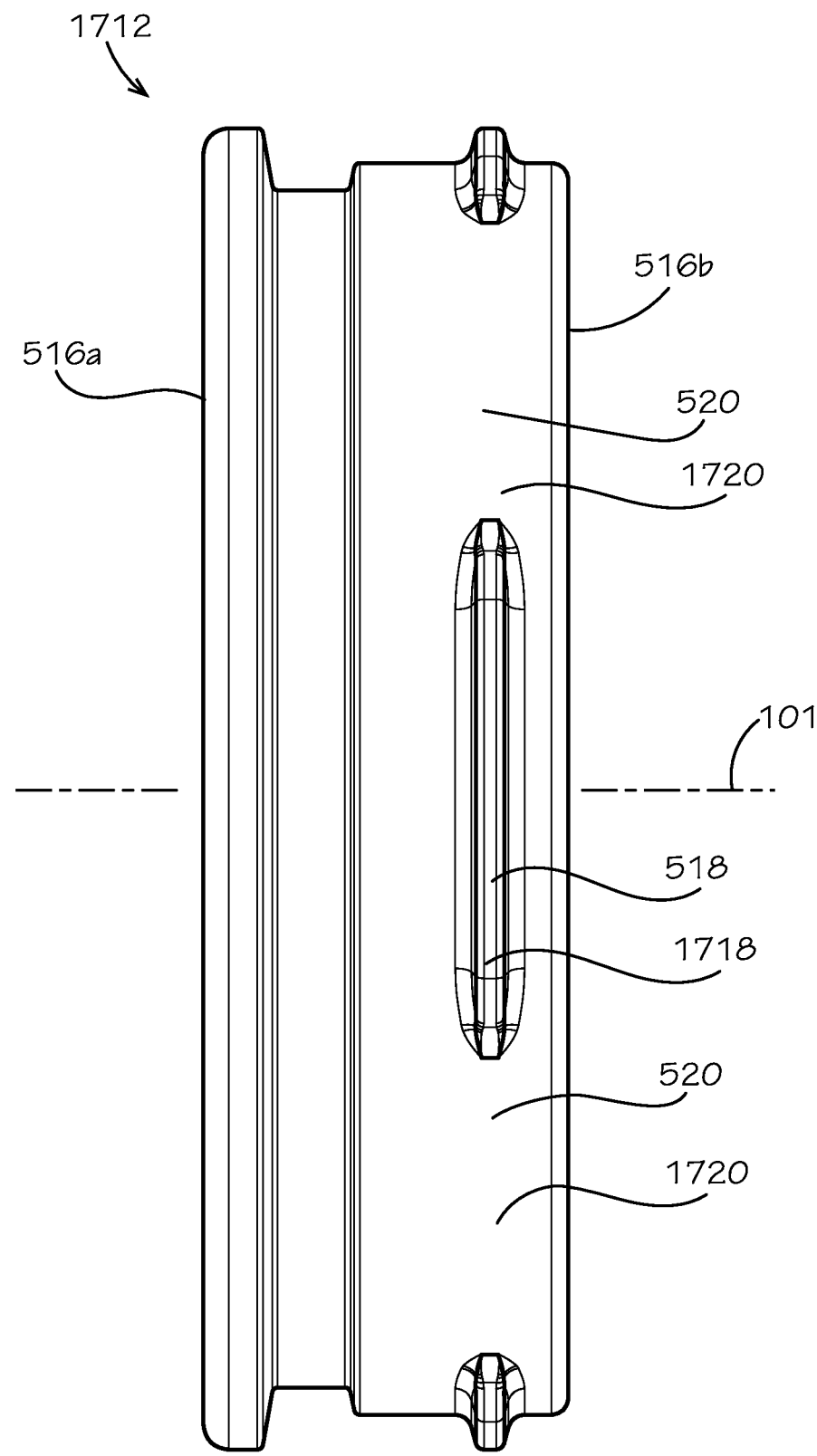
FIG. 17B is a side view of the stop lip cap of FIG. 17A.

FIG. 17A is a perspective view of another aspect of the cap wherein the cap is a stop lip cap 1712 in accordance with another aspect of the present disclosure. FIG. 17B is a side view of the stop lip cap 1712 of FIG. 17A. On the stop lip cap 1712, the raised lip 518 can be a stop lip 1718. The stop lip 1718 can be spaced axially inward towards the outer end 516*a* and away from the inner end 516*b* relative to the axis 101. The pressure relief channels 520 can also be defined by circumferential gaps 1720 in the stop lip 1718 in the present aspect.

Figure 17C:
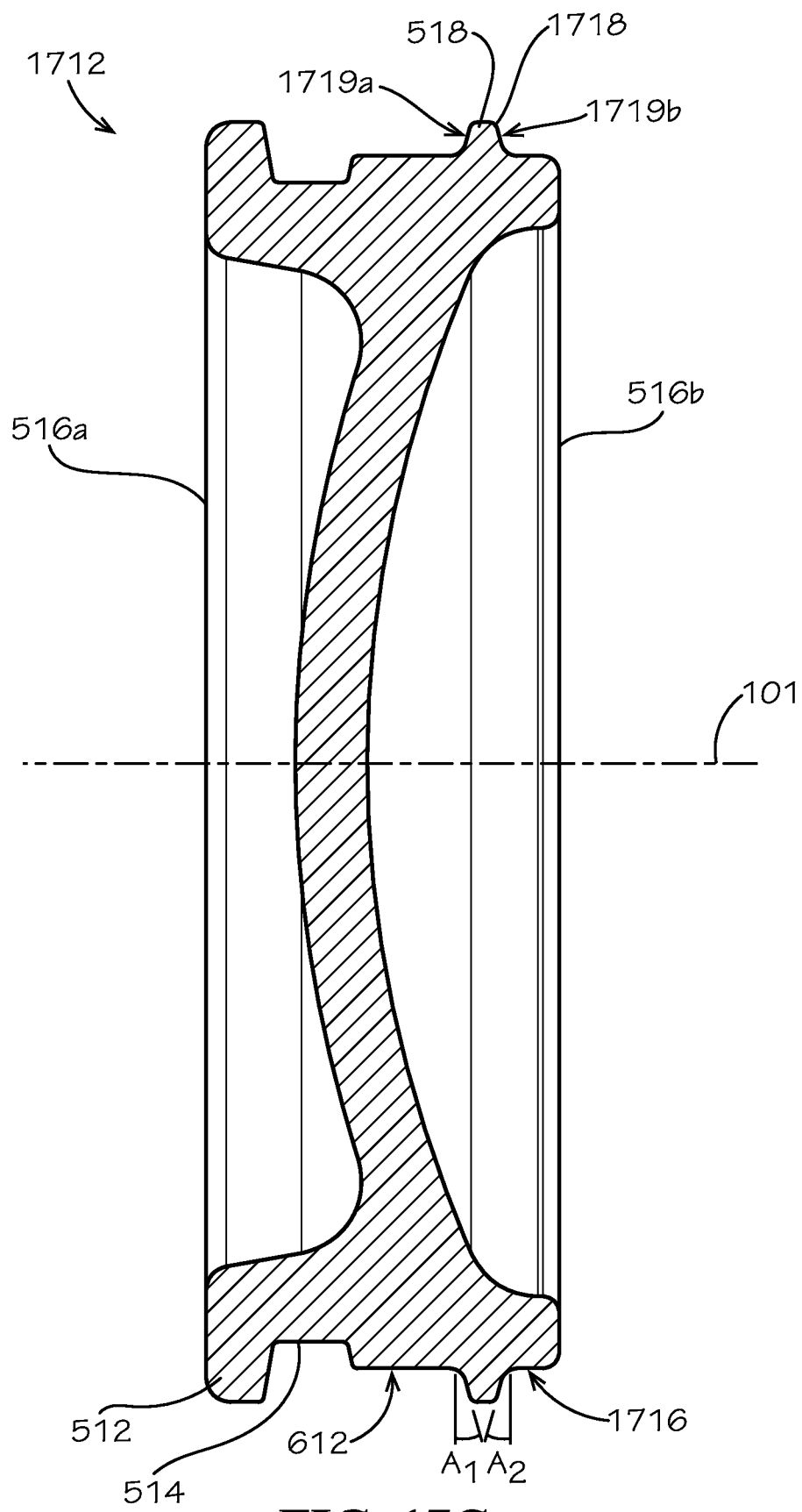
FIG. 17C is a cross-sectional view of the stop lip cap taken along line 17C-17C shown in FIG. 17A.

FIG. 17C is a cross-sectional view of the stop lip cap 1712 taken along line 17C-17C shown in FIG. 17A. Unlike the raised lip 518 of the aspects of the cap 112 of FIGS. 1-12H, in this aspect, the raised lip 518, stop lip 1718, does not extend to the inner end 516*b*. Instead, a step surface 1716 can be defined between the stop lip 1817 and the inner end 516*b*. In the present aspect, the step surface 1716 can be a cylindrical surface. In the present aspect, the step surface 1716 can be radially aligned with the sealing surface 612; however in other aspects, the step surface 1716 can be defined radially inward or radially outward from the sealing surface 612. In the present aspect, the step surface 1716 can be defined radially outward from the groove 514 but radially inward from the stop lip 1718 and the outer lip 512. In the present aspect, the stop lip 1718 can extend radially outwards even with the outer lip 512; however in other aspects, the stop lip 1718 can extend radially outwards beyond the outer lip 512.

The stop lip 1718 can define an outer surface 1719*a* facing the outer end 516*a* of the stop lip cap 1712 and an inner surface 1719*b* facing the inner end 516*b* of the stop lip cap 1712. The outer surface 1719*a* can define an outer angle $A_1$ relative to a radial direction of the axis 101, and the inner surface 1719*b* can define an inner angle $A_2$ relative to the radial direction of the axis 101. In the present aspect, each of the angles $A_1, A_2$ can be less than 45 degrees. In some aspects, the angles $A_1, A_2$ can be 0 degrees, and the inner surface 1719*a* and the outer surface 1719*b* can be parallel to the radial direction of the axis 101.

Figure 18A:
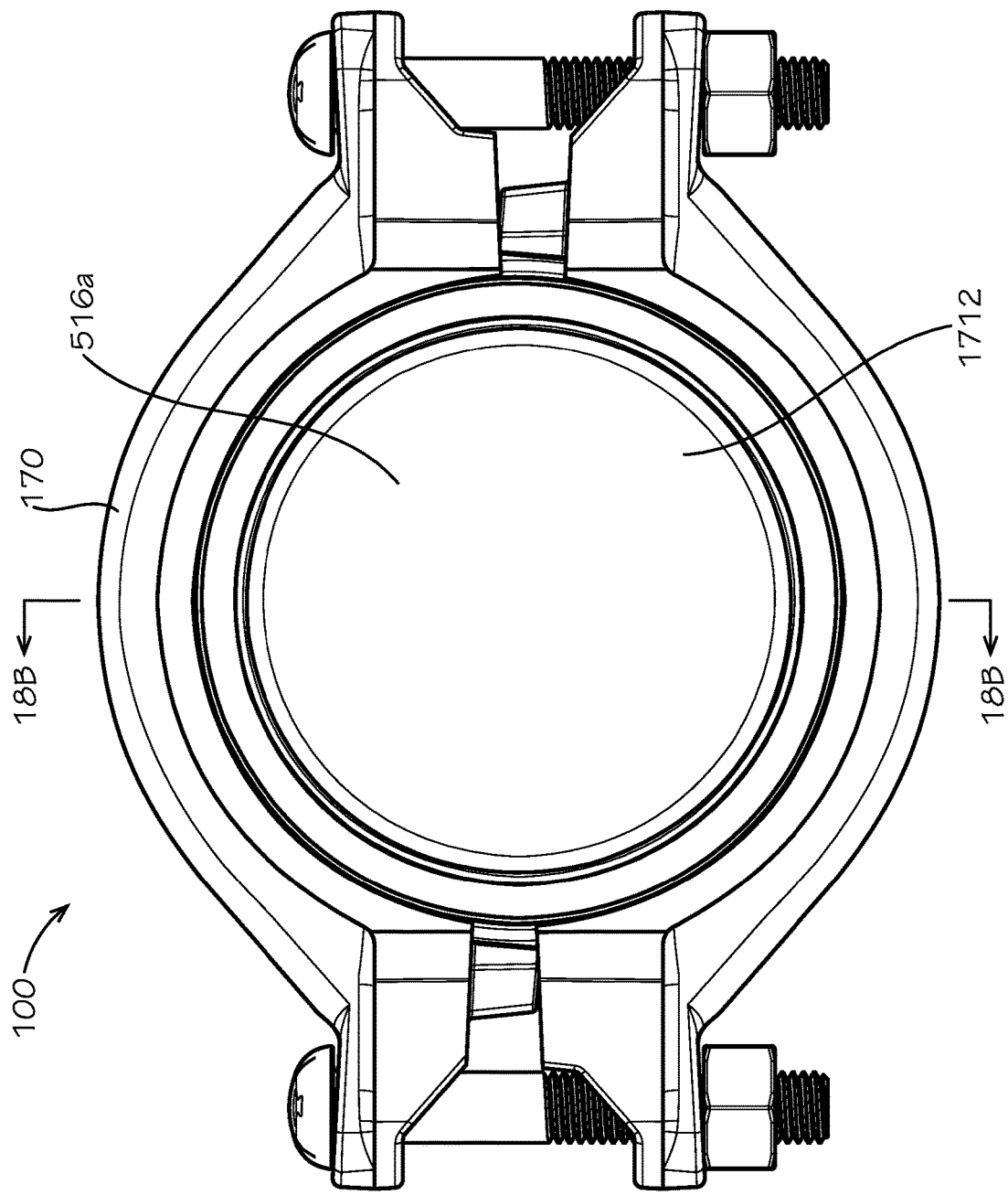
FIG. 18A is an end view of an aspect of the pre-assembled coupling comprising the stop lip cap of FIG. 17A.
Figure 18B:
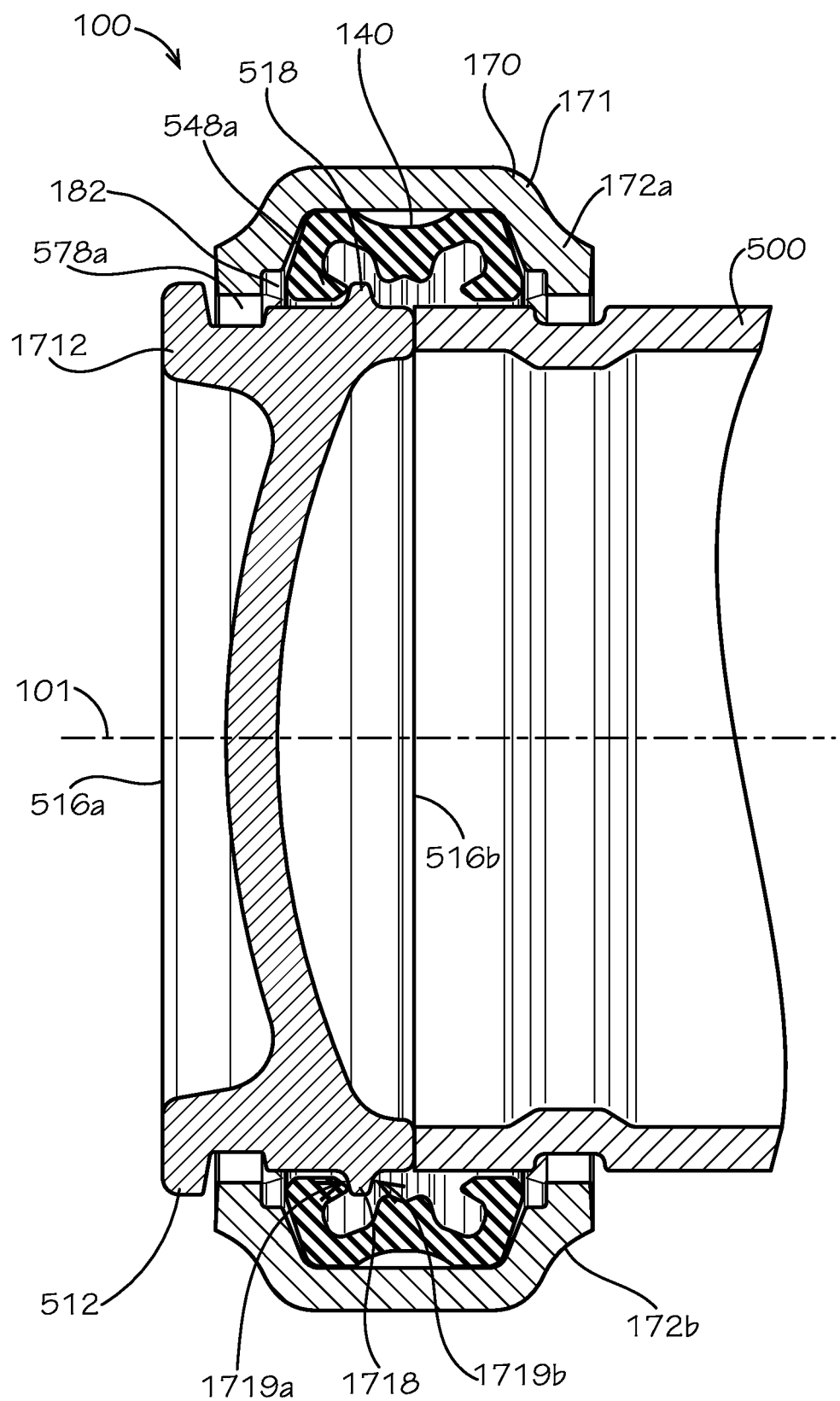
FIG. 18B is a cross-sectional side view of the pre-assembled coupling of FIG. 18A taken along line 18B-18B shown in FIG. 18A with the pipe of FIG. 5.

FIG. 18A is an end view of an aspect of the pre-assembled coupling 100 comprising the stop lip cap 1712 of FIGS. 17A-C. FIG. 18B is a cross-sectional side view of the pre-assembled coupling 100 of FIG. 18A taken along line 18B-18B shown in FIG. 18A with the pipe 500 of FIG. 5. In the present aspect, the stop lip 1718 can be specifically shaped to prevent insertion and withdrawal of the inner end 516*b* of the stop lip cap 1712 into the coupling bore 182 when the coupling 170 is in the relaxed position. For example, the stop lip 1718 can extend radially outward far enough to radially overlap with the ridge 578*a*. Consequently, if a user attempts to insert the inner end 516*b* into the coupling bore 182 in the relaxed state or remove the inner end 516*b* from the coupling bore 182 in the relaxed state, interference between the stop lip 1718 and the ridge 578*a* will prevent the user from succeeding. Instead, the user must disassemble the coupling 170 by separating the first segment 172*a* from the second segment 172*b* of the housing 171 to insert or remove the inner end 516*b* from the coupling bore 182. Therefore, to assemble the pre-assembled coupling 100, the user must first insert the inner end 516*b* into the gasket 140 and then assembled the housing 171 around the gasket 140. In some aspects, the inner end 516*b* cannot be stabbed into the gasket 140 without a tool to aid in expanding the sealing ridge 548*a* over the stop lip 1718, particularly in aspects wherein the inner angle $A_2$ (shown in FIG. 17C) approaches a very small value, such as less than 10 degrees.

Figure 19:
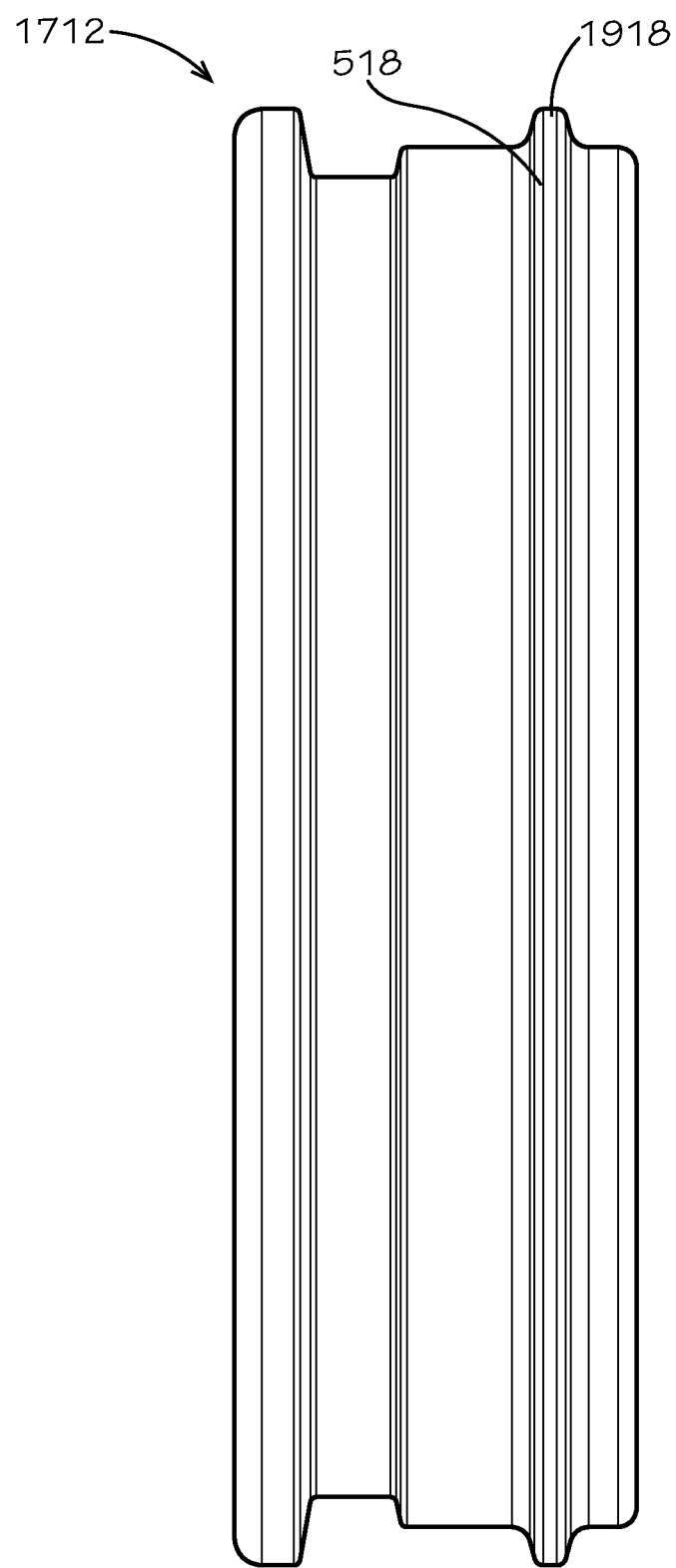
FIG. 19 is a side view of another aspect of the stop lip cap of FIG. 17A wherein the raised lip is a continuous stop lip.

FIG. 19 is a side view of another aspect of the stop lip cap 1712 wherein the raised lip 518 is a continuous stop lip 1918 which does not define the circumferential gaps 1720 (shown in FIG. 17A).

Figure 20:
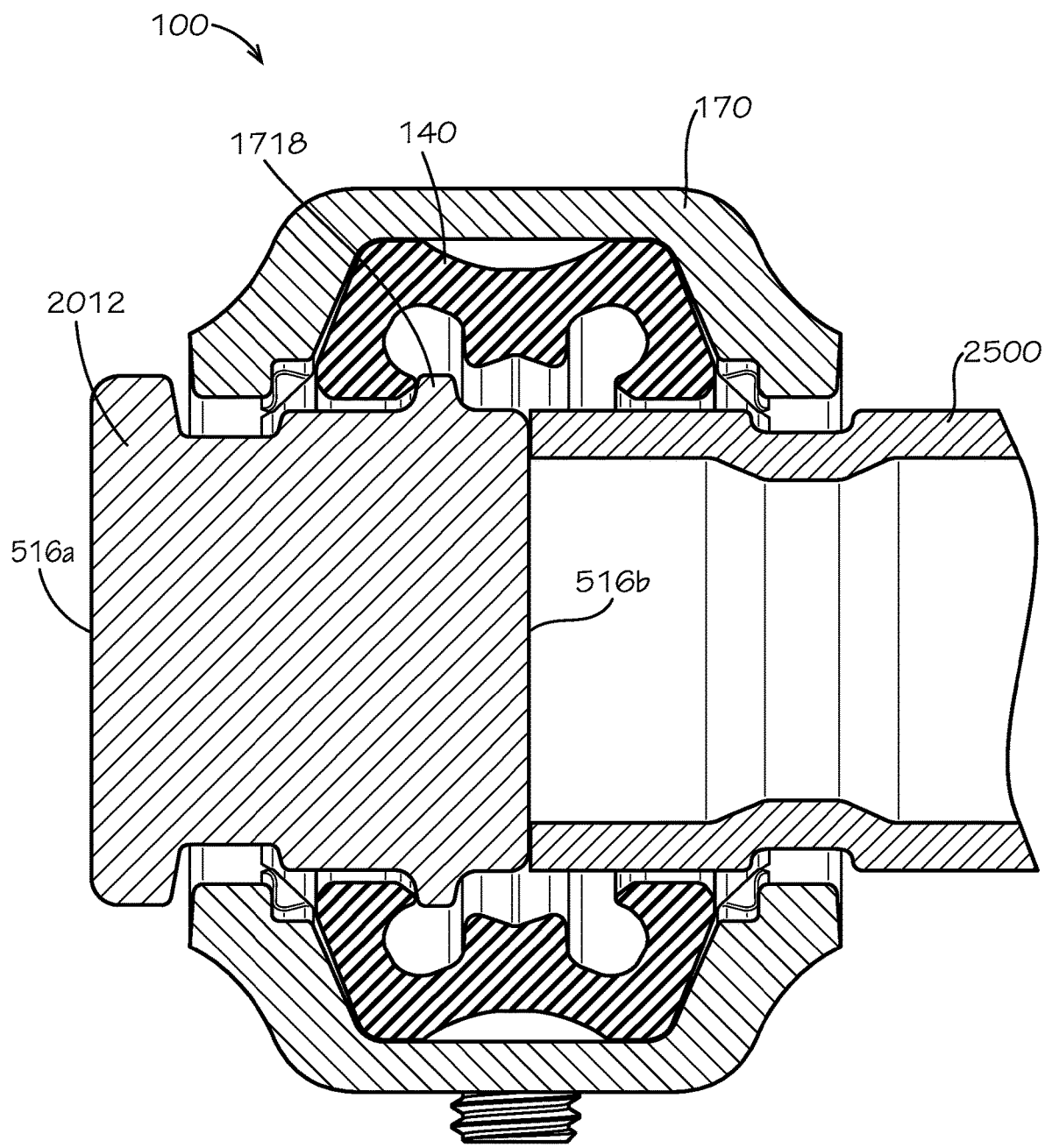
FIG. 20 is a cross-sectional side view of another aspect of the pre-assembled coupling comprising a solid stop lip cap and another aspect of a pipe in accordance with another aspect of the present disclosure.

FIG. 20 is a cross-sectional side view of another aspect of the pre-assembled coupling assembly 100 comprising a solid stop lip cap 2012 and another aspect of a pipe 2500 in accordance with another aspect of the present disclosure. The solid stop lip cap 2012 can be similar to the stop lip cap 1712 of FIG. 17A; however, the solid stop lip cap 2012 can be a solid piece of material extending from the outer end 516*a* to the inner end 516*b* without a separate annular ring 532 (shown in FIG. 5) and web 530 (shown in FIG. 5).

To pre-assemble the pre-assembled coupling assembly 100, the inner end 516*b* of the cap 112,212,1312,1712,2012, 3012,3212 can be inserted into a relaxed gasket 140, without the housing 171 assembled around the gasket 140, so that the inner end 516*b* can be axially positioned between the sealing ridges 548*a,b*. In some aspects, the sealing ridge 548*b* can contact the sealing surface 612 of the cap 112,212,1312, 1712,2012,3012,3212. As discussed above, in some aspects of the stop lip cap 1712,2012 a tool or tools may be required to stretch the sealing ridge 548*a* over the stop lip 1718.

In aspects of the cap 112,212, such as that of FIGS. 1, 2, and 15A-D, the gasket 140,3140 can be retained on the inner end 516*b* of the cap 112,212 due to interference between the sealing ridge 548*b*,3148*a* and the raised lip 518. In such aspects, the sealing ridge 548*b*,3148*a* can be stretched over the raised lip 518 when inserting the inner end 516*b* through the sealing ridge 548*b*,3148*a*, and elastic resistance of the sealing ridge 548*b* can resist withdrawal of the inner end 516*b* outward through the sealing ridge 548*b*,3148*a*, thereby retaining the relaxed gasket 140,3140 on the cap 112,212. In aspects of the cap 3012,3212 such as those of FIGS. 14A-D and 16A-C, the inner rim 3050,3250 of the gasket 140 can stretch over the raised lip 518,3018,3218 upon insertion of the inner end 516*b* into the relaxed gasket 140,3040,3240, and the inner rim 3050,3250 can seat in the groove 3014, 3222. Elastic resistance of the inner rim 3050,3250 can resist withdrawal of the inner end 516*b* of the cap 3012,3212 back through the inner rim 3050,3250, thereby retaining the relaxed gasket 140 on the inner end 516*b* of the cap 3012,3212. In these aspects of the cap 112,212,3012,3212, the housing 171 of the coupling 170 can then be assembled around the gasket 140,3040,3140,3240 by positioning the gasket 140,3040,3140,3240 within the gasket groove 570 of the segments 172*a,b* and fastening the segments 172*a,b* together with the fasteners 176*a,b*. The gasket 140,3040, 3140,3240 can then retain the coupling 170 on the inner end 516*b* of the cap 112,212,3012,3212.

Alternatively, for the aspect of the cap 1312 shown in FIG. 13A-E, the coupling 170 may not be retained on the inner end 516*b* of the cap 1312 by elastic resistance of the gasket 140. Instead the relaxed gasket 140 can be freely slipped over the inner end 516*b* with no or minimal resistance, and the grooved housing 1371 can be assembled around the gasket 140 and the secondary key 1378. The segments 172*a,b* can be aligned so that the gasket 140 fits within the gasket groove 570, and the secondary key 1378 fits within the secondary groove 1372, thereby retaining the coupling 170 on the cap 1312 through interference between the secondary groove 1372 and the secondary key 1378.

Once the coupling 170 is secured on the inner end 516*b* of the cap 112,212,1312,1712,3012,3212, the pipe 500 or another pipe fitting 110 can be stabbed into the assembled coupling 170 opposite from the cap 112,212,1312, 1712.3012,3212 when the coupling 170 is in the relaxed position. The coupling 170 can then be tightened to the tensioned position by tightening the fasteners 176*a,b*, thereby securing and sealing the cap 112,212,1312,1712, 3012,3212 to the pipe 500 or other pipe fitting 110.

In other aspects, the assembled coupling 170 in the relaxed position can be slipped over the cap 112,212,1312, 3012,3212 to secure the coupling 170 on the inner end 516*b* of the cap 112,212,1312,3012,3212. By contrast, the stop lip cap 1712,2012 can be specifically configured to prevent the assembled coupling 170 from being slipped over the stop lip 1718.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A cap configured for engagement with a coupling, the cap comprising:
    an annular ring extending circumferentially around an outer portion of the cap, the cap defining an inner end and an outer end disposed opposite from the inner end, the annular ring defining a raised lip between the inner end and the outer end, the annular ring defining a groove between the raised lip and the outer end, the annular ring defining a sealing surface positioned between the raised lip and the groove, the raised lip extending radially outward from the sealing surface, the groove extending radially inward from the sealing surface; and
    a web positioned within the annular ring, the web at least partially axially positioned between the groove and the raised lip, the web enclosing the annular ring.

2. The cap of claim 1, wherein the annular ring defines a pressure relief channel extending into the raised lip.

3. A pre-assembled coupling assembly comprising:
    a coupling, the coupling defining a coupling bore extending through the coupling, the coupling bore defining an axis, the coupling comprising a gasket disposed within the coupling bore between a first ridge and a second ridge of the coupling, the coupling being selectively repositionable about and between a relaxed position and a tensioned position, the gasket being relaxed and uncompressed when the coupling is in the relaxed position; and
    a cap, the cap defining a first end and a second end, the first end inserted into the coupling bore, the coupling retained on the first end of the cap when the coupling is in the relaxed position, the cap defining a raised lip between the first end and the second end, the cap defining a groove between the raised lip and the second end, the groove receiving the ridge in the tensioned position, the cap defining a sealing surface positioned between the raised lip and the groove, the gasket forming a seal with the sealing surface in the tensioned position, at least a portion of the raised lip being positioned radially outward from the sealing surface with respect to the axis.

4. The pre-assembled coupling assembly of claim 3, wherein the raised lip extends radially outward from the sealing surface relative to the axis.

5. The pre-assembled coupling assembly of claim 4 further comprising a pipe, and wherein:
the pipe defines an outer surface;
a sealing portion of the outer surface forms a seal with the gasket when the coupling is in the tensioned position; and
the raised lip is disposed radially outward from the sealing portion of the outer surface.

6. The pre-assembled coupling assembly of claim 4, wherein:
the gasket defines a first sealing ridge and a second sealing ridge; and
the raised lip is positioned axially between the first sealing ridge and the second sealing ridge with respect to the axis.

7. The pre-assembled coupling assembly of claim 4, wherein the gasket defines a rib that contacts the raised lip when the coupling is in the tensioned position.

8. The pre-assembled coupling assembly of claim 7, wherein:
the gasket defines a sealing ridge;
the gasket defines a sealing channel between the rib and the sealing ridge;
the cap defines a pressure relief channel extending through the raised lip; and
the pressure relief channel is in fluid communication with the sealing channel.

9. The pre-assembled coupling assembly of claim 3, wherein a portion of the raised lip is disposed radially outward from a portion of the gasket with respect to the axis when the coupling is in the relaxed position.

10. The pre-assembled coupling assembly of claim 3, wherein the cap defines an outer lip, and wherein the outer lip is configured to locate the ridge of the coupling above the groove of the cap.

11. A method for using a pre-assembled coupling assembly, the method comprising:
providing a cap, the cap defining an inner end and an outer end, the cap defining a raised lip between the outer end and the inner end, the cap defining a sealing surface positioned between the outer end and the raised lip, the raised lip extending radially outward from the sealing surface, the cap defining an axis;
axially inserting the inner end of the cap into a gasket, the gasket defining a first sealing ridge, a second sealing ridge, and a central portion, the central portion of the gasket extending between the first sealing ridge and the second sealing ridge, a radially outermost portion of the raised lip positioned radially outward from a portion of the first sealing ridge and a portion of the second sealing ridge, the central portion of the gasket positioned radially outward from the radially outermost portion of the raised lip, axially inserting the inner end of the cap into the gasket comprising:
positioning the raised lip axially between the first sealing ridge and the second sealing ridge; and
axially aligning the first sealing ridge with the sealing surface; and
assembling a housing around the gasket, the housing and the gasket comprising a coupling, the coupling retained on the inner end of the cap when the coupling is in a relaxed position.

12. The method of claim 11, wherein axially inserting the inner end of the cap into the gasket further comprises positioning the first sealing ridge of the gasket axially between the inner end and the outer end.

13. The method of claim 11, wherein axially inserting the inner end of the cap into the gasket further comprises stretching the first sealing ridge of the gasket over the raised lip of the cap.

14. The method of claim 11, wherein assembling a housing around the gasket comprises fastening at least one segment around the gasket, the at least one segment defining a gasket groove, the gasket seated within the gasket groove.

15. The method of claim 11, wherein the first sealing ridge is axially spaced apart from the second sealing ridge.

* * * * *